United States Patent
Lin et al.

(10) Patent No.: US 11,624,726 B2
(45) Date of Patent: Apr. 11, 2023

(54) DIFFERENTIAL SENSING WITH BIOFET SENSORS

(71) Applicant: Taiwan Semiconductor Manufacturing Co., Ltd., Hsinchu (TW)

(72) Inventors: Ching-Hui Lin, Taichung (TW); Chun-Ren Cheng, Hsinchu (TW); Shih-Fen Huang, Jhubei (TW); Fu-Chun Huang, Zhubei (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 206 days.

(21) Appl. No.: 17/208,596

(22) Filed: Mar. 22, 2021

(65) Prior Publication Data
US 2021/0231603 A1 Jul. 29, 2021

Related U.S. Application Data

(62) Division of application No. 16/400,500, filed on May 1, 2019, now Pat. No. 10,955,379.

(60) Provisional application No. 62/737,645, filed on Sep. 27, 2018.

(51) Int. Cl.
*G01N 27/414* (2006.01)
*G01N 27/30* (2006.01)
*B01L 3/00* (2006.01)

(52) U.S. Cl.
CPC .... *G01N 27/4145* (2013.01); *B01L 3/502715* (2013.01); *G01N 27/302* (2013.01); *G01N 27/4148* (2013.01)

(58) Field of Classification Search
CPC ............ G01N 27/4145; G01N 27/4148; B01L 3/502715
See application file for complete search history.

(56) References Cited

U.S. PATENT DOCUMENTS

| | | | |
|---|---|---|---|
| 10,984,211 B1 * | 4/2021 | Lin | G01N 27/414 |
| 2017/0059514 A1 * | 3/2017 | Hoffman | G01N 33/5438 |
| 2017/0160226 A1 * | 6/2017 | Huang | G01N 27/4145 |
| 2018/0172672 A1 | 6/2018 | Parker et al. | |

* cited by examiner

*Primary Examiner* — Dale E Page
*Assistant Examiner* — Wilner Jean Baptiste
(74) *Attorney, Agent, or Firm* — Sterne, Kessler, Goldstein & Fox P.L.L.C.

(57) ABSTRACT

A sensor array includes a semiconductor substrate, a first plurality of FET sensors and a second plurality of FET sensors. Each of the FET sensors includes a channel region between a source and a drain region in the semiconductor substrate and underlying a gate structure disposed on a first side of the channel region, and a dielectric layer disposed on a second side of the channel region opposite from the first side of the channel region. A first plurality of capture reagents is coupled to the dielectric layer over the channel region of the first plurality of FET sensors, and a second plurality of capture reagents is coupled to the dielectric layer over the channel region of the second plurality of FET sensors. The second plurality of capture reagents is different from the first plurality of capture reagents.

20 Claims, 14 Drawing Sheets

DIFFERENTIAL SENSING WITH BIOFET SENSORS

CROSS-REFERENCE TO RELATED APPLICATIONS

This application is a divisional of U.S. patent application Ser. No. 16/400,500, titled "Differential Sensing with BioFet Sensors," filed on May 1, 2019, which claims the benefit of U.S. Provisional Patent Application No. 62/737,645, titled "Microorganism Screening and Culture BioFET Chip," filed Sep. 27, 2018, each of which is incorporated by reference in its entirety.

BACKGROUND

Biosensors are devices for sensing and detecting biomolecules and operate on the basis of electronic, electrochemical, optical, and mechanical detection principles. Biosensors that include transistors are sensors that electrically sense charges, photons, and mechanical properties of bio-entities or biomolecules. The detection can be performed by detecting the bio-entities or biomolecules themselves, or through interaction and reaction between specified reactants and bio-entities/biomolecules. Such biosensors can be manufactured using semiconductor processes, can quickly convert electric signals, and can be easily applied to integrated circuits (ICs) and microelectromechanical systems (MEMS).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
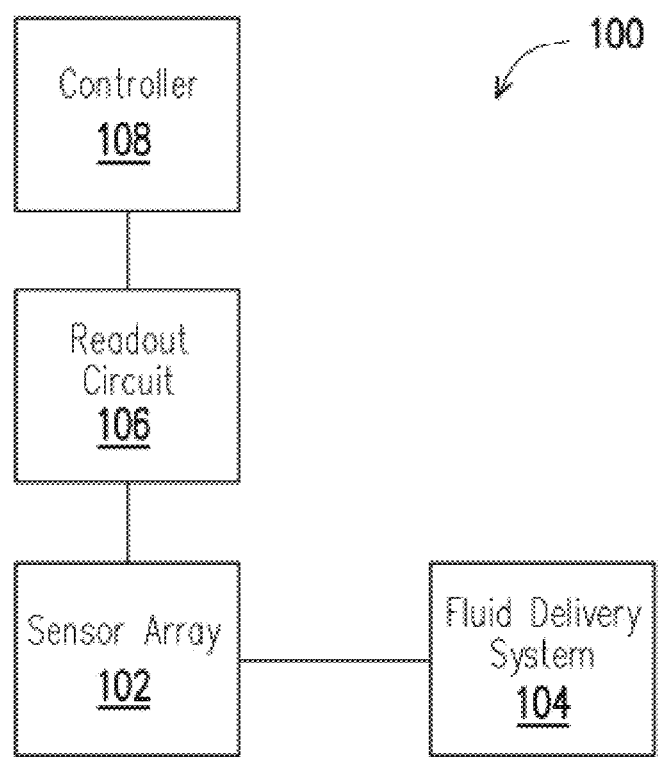
FIG. 1 illustrates components of a sensing device, according to some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed and/or disposed between the first and second features, such that the first and second features may not be in direct contact. In addition, the present disclosure may repeat reference numerals and/or letters in the various examples. This does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (e.g., rotated 90 degrees or at other orientations) and the spatially relative descriptors used herein may likewise be interpreted accordingly.

Terminology

Unless defined otherwise, all technical and scientific terms used herein have the same meanings as commonly understood by one of ordinary skill in the art to which this disclosure belongs. Although any methods and materials similar or equivalent to those described herein can be used in the practice or testing of embodiments in accordance with the disclosure; the methods, devices, and materials are now described. All patents and publications mentioned herein are incorporated herein by reference for the purpose of describing and disclosing the materials and methodologies that are reported in the publications may be used in connection with the present disclosure.

The acronym "FET," as used herein, refers to a field effect transistor. A type of FET is referred to as a "metal oxide semiconductor field effect transistor" (MOSFET). MOSFETs can be planar structures built in and on the planar surface of a substrate such as a semiconductor wafer. MOSFETs can also have a three-dimensional, fin-based structures.

The term "bioFET" refers to a FET that includes a layer of capture reagents that act as surface receptors to detect the presence of a target analyte of biological origin. A bioFET is a field-effect sensor with a semiconductor transducer, according to some embodiments. One advantage of bioFETs is the prospect of label-free operation. Specifically, bioFETs enable the avoidance of costly and time-consuming labeling operations such as the labeling of an analyte with, for instance, fluorescent or radioactive probes. One specific type of bioFET described herein is a "dual-gate back-side sensing bioFET." The analytes for detection by a bioFET can be of biological origin such as, for example and without limitation, proteins, carbohydrates, lipids, tissue fragments, or portions thereof. A bioFET can be part of a broader genus of FET sensors that may also detect a chemical compound; this type of bioFET is known as a "ChemFET") or any other element. A bioFET can also detect ions such as protons or metallic ions; this type of bioFET is known as an "ISFET." The present disclosure applies to all types of FET-based sensors ("FET Sensors"). One specific type of FET Sensor described herein is a "Dual-Gate Back Side Sensing FET Sensor" (DG BSS FET Sensor).

"S/D" refers to the source/drain junctions that form two of the four terminals of a FET.

The expression "high-k" refers to a high dielectric constant. In the field of semiconductor device structures and manufacturing processes, high-k refers to a dielectric constant that is greater than the dielectric constant of $SiO_2$ (i.e., greater than 3.9).

The term "vertical," as used herein, means nominally perpendicular to the surface of a substrate.

The term "analysis" generally refers to a process or step involving physical, chemical, biochemical, or biological analysis that includes, but is not limited to, characterization, testing, measurement, optimization, separation, synthesis, addition, filtration, dissolution, or mixing.

The term "assay" generally refers to a process or step involving the analysis of a chemical or a target analyte and includes, but is not limited to, cell-based assays, biochemical assays, high-throughput assays and screening, diagnostic assays, pH determination, nucleic acid hybridization assays, polymerase activity assays, nucleic acid and protein sequencing, immunoassays (e.g., antibody-antigen binding assays, ELISAs, and iqPCR), bisulfite methylation assays for detecting methylation pattern of genes, protein assays, protein binding assays (e.g., protein-protein, protein-nucleic acid, and protein-ligand binding assays), enzymatic assays, coupled enzymatic assays, kinetic measurements (e.g., kinetics of protein folding and enzymatic reaction kinetics), enzyme inhibitor and activator screening, chemiluminescence and electrochemiluminescence assays, fluorescent assays, fluorescence polarization and anisotropy assays, absorbance and colorimetric assays (e.g., Bradford assay, Lowry assay, Hartree-Lowry assay, Biuret assay, and BCA assay), chemical assays (e.g., for the detection of environmental pollutants and contaminants, nanoparticles, or polymers), and drug discovery assays, whole genome analysis, genome typing analysis, genomic, exome analysis, microbiome analysis, and clinical analysis including, but not limited to, cancer analysis, non-invasive prenatal testing (NIPT) analysis, and/or UCS analysis. The apparatus, systems, and methods described herein may use or adopt one or more of these assays to be used with any of the FET Sensor described designs.

The term "liquid biopsy" generally refers to a biopsy sample obtained from a subject's bodily fluid as compared to a subject's tissue sample. The ability to perform assays using a body fluid sample is oftentimes more desirable than using a tissue sample. The less invasive approach using a body fluid sample has wide ranging implications in terms of patient welfare, the ability to conduct longitudinal disease monitoring, and the ability to obtain expression profiles even when tissue cells are not easily accessible, for example, in the prostate gland. Assays used to detect target analytes in liquid biopsy samples include, but are not limited to, those described above. As a non-limiting example, a circulating tumor cell (CTC) assay can be conducted on a liquid biopsy sample.

For example, a capture reagent (e.g., an antibody) immobilized on a FET Sensor may be used for detection of a target analyte (e.g., a tumor cell marker) in a liquid biopsy sample using a CTC assay. CTCs are cells that have shed into the vasculature from a tumor and circulate, for example, in the bloodstream. Generally CTCs are present in circulation in low concentrations. To assay the CTCs, CTCs are enriched from patient blood or plasma by various techniques known in the art. CTCs may be stained for specific markers using methods known in the art including, but not limited to, cytometry (e.g., flow cytometry)-based methods and IHC-based methods. For the apparatus, systems, and methods described herein, CTCs may be captured or detected using a capture reagent or the nucleic acids, proteins, or other cellular milieu from the CTCs may be targeted as target analytes for binding to or detection by a capture reagent.

When a target analyte is detected on or from a CTC, for example, an increase in target analyte expressing or containing CTCs may help identify the subject as having a cancer that is likely to respond to a specific therapy (e.g., one associated with a target analyte) or allow for optimization of a therapeutic regimen with, for example, an antibody to the target analyte. CTC measurement and quantitation can provide information on, for example, the stage of tumor, response to therapy, disease progression, or a combination thereof. The information obtained from detecting the target analyte on the CTC can be used, for example, as a prognostic, predictive, or pharmacodynamic biomarker. In addition, CTCs assays for a liquid biopsy sample may be used either alone or in combination with additional tumor marker analysis of solid biopsy samples.

The term "identification" generally refers to the process of determining the identity of a target analyte based on its binding to a capture reagent whose identity is known.

The term "measurement" generally refers to the process of determining the amount, quantity, quality, or property of a target analyte based on its binding to a capture reagent.

The term "quantitation" generally refers to the process of determining the quantity or concentration of a target analyte based on its binding to a capture reagent.

The term "detection" generally refers to the process of determining the presence or absence of a target analyte based on its binding to a capture reagent. Detection includes but is not limited to identification, measurement, and quantitation.

The term "chemical" refers to a substance, compound, mixture, solution, emulsion, dispersion, molecule, ion, dimer, macromolecule such as a polymer or protein, biomolecule, precipitate, crystal, chemical moiety or group, particle, nanoparticle, reagent, reaction product, solvent, or fluid any one of which may exist in the solid, liquid, or gaseous state, and which can be the subject of an analysis.

The term "reaction" refers to a physical, chemical, biochemical, or biological transformation that involves at least one chemical and that generally involves (in the case of chemical, biochemical, and biological transformations) the breaking or formation of one or more bonds such as covalent, noncovalent, van der Waals, hydrogen, or ionic bonds. The term includes chemical reactions such as, for example, synthesis reactions, neutralization reactions, decomposition reactions, displacement reactions, reduction-oxidation reactions, precipitation, crystallization, combustion reactions, and polymerization reactions, as well as covalent and non-covalent binding, phase change, color change, phase formation, crystallization, dissolution, light emission, changes of light absorption or emissive properties, temperature change or heat absorption or emission, conformational change, and folding or unfolding of a macromolecule such as a protein.

"Capture reagent" as used herein, is a molecule or compound capable of binding the target analyte, which can be directly or indirectly attached to a substantially solid material. The capture reagent can be a chemical, and specifically any substance for which there exists a naturally occurring target analyte (e.g., an antibody, polypeptide, DNA, RNA, cell, virus, etc.) or for which a target analyte can be prepared, and the capture reagent can bind to one or more target analytes in an assay. The capture reagent may be non-naturally occurring or naturally-occurring, and if naturally-occurring may be synthesized in vivo or in vitro.

"Target analyte" as used herein, is the substance to be detected in the test sample using embodiments of the present disclosure. The target analyte can be a chemical, and specifically any substance for which there exists a naturally occurring capture reagent (e.g., an antibody, polypeptide, DNA, RNA, cell, virus, etc.) or for which a capture reagent can be prepared, and the target analyte can bind to one or more capture reagents in an assay. "Target analyte" also includes any antigenic substances, antibodies, and combinations thereof. The target analyte can include a protein, a peptide, an amino acid, a carbohydrate, a hormone, a steroid, a vitamin, a drug including those administered for therapeutic purposes as well as those administered for illicit purposes, a bacterium, a virus, and metabolites of or antibodies to any of the above substances.

"Test sample" as used herein, means the composition, solution, substance, gas, or liquid containing the target analyte to be detected and assayed using embodiments of the present disclosure. The test sample can contain other components besides the target analyte, can have the physical attributes of a liquid, or a gas, and can be of any size or volume, including for example, a moving stream of liquid or gas. The test sample can contain any substances other than the target analyte as long as the other substances do not interfere with the binding of the target analyte with the capture reagent or the specific binding of the first binding member to the second binding member. Examples of test samples include, but are not limited to, naturally-occurring and non-naturally occurring samples or combinations thereof. Naturally-occurring test samples can be synthetic or synthesized. Naturally-occurring test samples include body or bodily fluids isolated from anywhere in or on the body of a subject including, but not limited to, blood, plasma, serum, urine, saliva or sputum, spinal fluid, cerebrospinal fluid, pleural fluid, nipple aspirates, lymph fluid, fluid of the respiratory, intestinal, and genitourinary tracts, tear fluid, saliva, breast milk, fluid from the lymphatic system, semen, cerebrospinal fluid, intra-organ system fluid, ascitic fluid, tumor cyst fluid, amniotic fluid and combinations thereof, and environmental samples such as ground water or waste water, soil extracts, air, and pesticide residues or food-related samples.

Detected substances can include, for example, nucleic acids (including DNA and RNA), hormones, different pathogens (including a biological agent that causes disease or illness to its host, such as a virus (e.g., H7N9 or HIV), a protozoan (e.g., *Plasmodium*-causing malaria), or a bacteria (e.g., *E. coli* or *Mycobacterium tuberculosis*), proteins, antibodies, various drugs or therapeutics or other chemical or biological substances, including hydrogen or other ions, non-ionic molecules or compounds, polysaccharides, small chemical compounds such as chemical combinatorial library members, and the like. Detected or determined parameters may include but are not limited to, for example, pH changes, lactose changes, changing concentration, particles per unit time where a fluid flows over the device for a period of time to detect particles, for example, particles that are sparse, and other parameters.

As used herein, the term "immobilized," when used with respect to, for example, a capture reagent, includes substantially attaching the capture reagent at a molecular level to a surface. For example, a capture reagent may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the capture reagent to the surface. Immobilizing a capture reagent to a surface of a substrate material may be based upon the properties of the substrate surface, the medium carrying the capture reagent, and the properties of the capture reagent. In some cases, a substrate surface may be first modified to have functional groups bound to the surface. The functional groups may then bind to biomolecules or biological or chemical substances to immobilize them thereon.

The term "nucleic acid" generally refers to a set of nucleotides connected to each other via phosphodiester bond and refers to a naturally occurring nucleic acid to which a naturally occurring nucleotide existing in nature is connected, such as DNA including deoxyribonucleotides having any of adenine, guanine, cytosine, and thymine connected to each other and/or RNA including ribonucleotides having any of adenine, guanine, cytosine, and uracil connected to each other. Naturally-occurring nucleic acids include, for example, DNA, RNA, and microRNA (miRNA). In addition, non-naturally occurring nucleotides and non-naturally occurring nucleic acids are within the scope of the nucleic acids of the present disclosure. Examples include cDNA, peptide nucleic acids (PNA), peptide nucleic acids with phosphate groups (PHONA), bridged nucleic acids/locked nucleic acids (BNA/LNA), and morpholino nucleic acids. Further examples include chemically-modified nucleic acids and nucleic acid analogues, such as methylphosphonate DNA/RNA, phosphorothioate DNA/RNA, phosphoramidate DNA/RNA, and 2'-O-methyl DNA/RNA. Nucleic acids include those that may be modified. For example, a phosphoric acid group, a sugar, and/or a base in a nucleic acid may be labeled as necessary. Any substances for nucleic acid labeling known in the art can be used for labeling. Examples thereof include but are not limited to radioactive isotopes (e.g., 32P, 3H, and 14C), DIG, biotin, fluorescent dyes (e.g., FITC, Texas, cy3, cy5, cy7, FAM, HEX, VIC, JOE, Rox, TET, Bodipy493, NBD, and TAMRA), and luminescent substances (e.g., acridinium ester).

Aptamer as used herein refers to oligonucleic acids or peptide molecules that bind to a specific target molecule. The concept of using single-stranded nucleic acids (aptamers) as affinity molecules for protein binding was initially disclosed in Ellington, Andrew D., and Jack W. Szostak, "Selection in vitro of single-stranded DNA molecules that fold into specific ligand-binding structures." *Nature* 355 (1992): 850-852; Tuerk, Craig, and Larry Gold, "Systematic evolution of ligands by exponential enrichment: RNA ligands to bacteriophage T4 DNA polymerase." *Science* 249.4968 (1990): 505-510) and is based on the ability of short sequences to fold, in the presence of a target, into unique, three-dimensional structures that bind the target with high affinity and specificity. Ng, Eugene W M, et al. "Pegaptanib, a targeted anti-VEGF aptamer for ocular vascular disease." *Nature Reviews, Drug Discovery* 5.2 (2006): 123, discloses that aptamers are oligonucleotide ligands that are selected for high-affinity binding to molecular targets.

The term "protein" generally refers to a set of amino acids linked together usually in a specific sequence. A protein can be either naturally-occurring or non-naturally occurring. As used herein, the term "protein" includes amino acid sequences, as well as amino acid sequences that have been modified to contain moieties or groups such as sugars, polymers, metalloorganic groups, fluorescent or light-emitting groups, moieties or groups that enhance or participate in a process such as intramolecular or intermolecular electron transfer, moieties or groups that facilitate or induce a protein into assuming a particular conformation or series of conformations, moieties or groups that hinder or inhibit a protein from assuming a particular conformation or series of conformations, moieties or groups that induce, enhance, or inhibit protein folding, or other moieties or groups that are incorporated into the amino acid sequence and that are intended to modify the sequence's chemical, biochemical, or biological properties. As used herein, proteins include, but are not limited to, enzymes, structural elements, antibodies, antigen-binding antibody fragments, hormones, receptors, transcription factors, electron carriers, and other macromolecules that are involved in processes such as cellular processes or activities. Proteins can have up to four structural levels that include primary, secondary, tertiary, and quaternary structures.

The term "antibody" as used herein refers to a polypeptide of the immunoglobulin family that is capable of binding a corresponding antigen non-covalently, reversibly, and in a specific manner. For example, a naturally occurring IgG antibody is a tetramer including at least two heavy (H) chains and two light (L) chains inter-connected by disulfide bonds. Each heavy chain includes a heavy chain variable region (abbreviated herein as VH) and a heavy chain constant region. The heavy chain constant region includes three domains, CH1, CH2 and CH3. Each light chain includes a light chain variable region (abbreviated herein as VL) and a light chain constant region. The light chain constant region includes one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs arranged from amino-terminus to carboxy-terminus in the following order: FR1, CDR1, FR2, CDR2, FR3, CDR3, and FR4. The three CDRs constitute about 15-20% of the variable domains. The variable regions of the heavy and light chains contain a binding domain that interacts with an antigen. The constant regions of the antibodies may mediate the binding of the immunoglobulin to host tissues or factors, including various cells of the immune system (e.g., effector cells) and the first component (C1q) of the classical complement system. (Kuby, Immunology, 4th ed., Chapter 4. W.H. Freeman & Co., New York, 2000).

The term "antibody" includes, but is not limited to, monoclonal antibodies, human antibodies, humanized antibodies, chimeric antibodies, and anti-idiotypic (anti-Id) antibodies (including, for example, anti-Id antibodies to antibodies of the present disclosure). The antibodies can be of any isotype/class (e.g., IgG, IgE, IgM, IgD, IgA, and IgY), or subclass (e.g., IgG1, IgG2, IgG3, IgG4, IgA1 and IgA2).

The term "antigen binding fragment", as used herein, refers to one or more portions of an antibody that retain the ability to specifically interact with (e.g., by binding, steric hindrance, stabilizing/destabilizing, and spatial distribution) an epitope of an antigen. Examples of binding fragments include, but are not limited to, single-chain Fvs (scFv), camelid antibodies, disulfide-linked Fvs (sdFv), Fab fragments, F(ab') fragments, a monovalent fragment consisting of the VL, VH, CL, and CH1 domains; a F(ab)2 fragment, a bivalent fragment including two Fab fragments linked by a disulfide bridge at the hinge region; a Fd fragment consisting of the VH and CH1 domains; a Fv fragment consisting of the VL and VH domains of a single arm of an antibody; a dAb fragment (Ward, E. Sally, et al., "Binding activities of a repertoire of single immunoglobulin variable domains secreted from *Escherichia coli*." Nature 341.6242 (1989): 544-546), which consists of a VH domain; and an isolated complementarity determining region (CDR), or other epitope-binding fragments of an antibody.

Furthermore, although the two domains of the Fv fragment (VL and VH) are coded for by separate genes, they can be joined (using recombinant methods) by a synthetic linker that enables them to be made as a single protein chain, in which the VL and VH regions pair to form monovalent molecules (known as single chain Fv ("scFv"); see, e.g., Bird, Robert E., et al., "Single-chain antigen-binding proteins." *Science* 242.4877 (1988): 423-427; and Huston, James S., et al., "Protein engineering of antibody binding sites: recovery of specific activity in an anti-digoxin single-chain Fv analogue produced in *Escherichia coli*." *Proceedings of the National Academy of Sciences* 85.16 (1988): 5879-5883). Such single chain antibodies are also intended to be encompassed within the term "antigen binding fragment." These antigen binding fragments are obtained using conventional techniques known to those of skill in the art, and the fragments are screened for utility in the same manner as are intact antibodies.

Antigen binding fragments can also be incorporated into single domain antibodies, maxibodies, minibodies, single domain antibodies, intrabodies, diabodies, triabodies, tetrabodies, v-NAR, and bis-scFv (see, e.g., Holliger, Philipp, and Peter J. Hudson, "Engineered antibody fragments and the rise of single domains." *Nature Biotechnology* 23.9 (2005): 1126). Antigen binding fragments can be grafted into scaffolds based on polypeptides such as fibronectin type III (Fn3) (see U.S. Pat. No. 6,703,199, which describes fibronectin polypeptide monobodies).

Antigen binding fragments can be incorporated into single chain molecules including a pair of tandem Fv segments (VH-CH1-VH-CH1) which, together with complementary light chain polypeptides, form a pair of antigen binding regions (Zapata, Gerardo, et al., "Engineering linear F(ab')2 fragments for efficient production in *Escherichia coli* and enhanced antiproliferative activity." *Protein Engineering, Design and Selection* 8.10 (1995): 1057-1062 and U.S. Pat. No. 5,641,870).

The term "monoclonal antibody" or "monoclonal antibody composition" as used herein refers to polypeptides, including antibodies and antigen binding fragments that have substantially identical amino acid sequence or are derived from the same genetic source. This term also includes preparations of antibody molecules of single molecular composition. A monoclonal antibody composition displays a single binding specificity and affinity for a particular epitope.

The term "nanoparticles" refers to atomic, molecular or macromolecular particles in the length scale, for example, of approximately 1 to 100 nm. Novel and differentiating properties and functions of nanoparticles are observed or developed at a critical length scale of matter such as, for example, under 100 nm. Nanoparticles may be used in constructing nanoscale structures and may be integrated into larger material components, systems, and architectures. In some embodiments, the critical length scale for novel properties and phenomena involving nanoparticles may be under 1 nm (e.g., manipulation of atoms at approximately 0.1 nm) or it may be larger than 100 nm (e.g., nanoparticle reinforced polymers have the unique feature at approximately 200 to 300 nm as a function of the local bridges or bonds between the nanoparticles and the polymer).

The term "nucleation composition" refers to a substance or mixture that includes one or more nuclei capable of growing into a crystal under conditions suitable for crystal formation. A nucleation composition may, for example, be induced to undergo crystallization by evaporation, changes in reagent concentration, adding a substance such as a precipitant, seeding with a solid material, mechanical agitation, or scratching of a surface in contact with the nucleation composition.

The term "particulate" refers to a cluster or agglomeration of particles such as atoms, molecules, ions, dimers, polymers, or biomolecules. Particulates may include solid matter or be substantially solid, but they may also be porous or partially hollow. They may contain a liquid or gas. In addition, particulates may be homogeneous or heterogeneous; that is, they may include one or more substances or materials.

The term "polymer" means any substance or compound that is composed of two or more building blocks ('mers') that are repetitively linked to each other. For example, a "dimer" is a compound in which two building blocks have been joined together. Polymers include both condensation and addition polymers. Examples of condensation polymers include polyamide, polyester, protein, wool, silk, polyurethane, cellulose, and polysiloxane. Examples of addition polymers are polyethylene, polyisobutylene, polyacrylonitrile, poly(vinyl chloride), and polystyrene. Other examples include polymers having enhanced electrical or optical properties (e.g., a nonlinear optical property) such as electroconductive or photorefractive polymers. Polymers include both linear and branched polymers.

Overview of Exemplary Biosensing Device

FIG. 1 illustrates an overview of components that may be included in a biosensor system 100. Biosensor system 100 includes a sensor array 102 having at least one sensing element for detecting a biological or chemical analyte and a fluid delivery system 104 designed to deliver one or more fluid samples to sensor array 102. Fluid delivery system 104 may be a microfluidic well positioned above sensor array 102 to contain a fluid over sensor array 102. Fluid delivery system 104 may also include microfluidic channels for delivering various fluids to sensor array 102. Fluid delivery system 104 may include any number of valves, pumps, chambers, channels designed to deliver fluid to sensor array 102. Sensor array 102 may include a repeating layout of sensors across a surface. For example, sensors may be arranged in a two-dimensional array of rows and columns across the surface.

A readout circuit 106 is provided to measure signals from the sensors in sensor array 102 and to generate a quantifiable sensor signal indicative of the amount of a certain analyte that is present in a target solution, according to some embodiments.

A controller 108 may be used to send and receive electrical signals to both sensor array 102 and readout circuit 106 to perform bio- or chemical-sensing measurements. Controller 108 may also be used to send electrical signals to fluid delivery system 104 to, for example, actuate one or more valves, pumps, or motors.

Sensor array 102 may include an array of bioFETs, where one or more of the bioFETs in the array are functionalized to detect a particular target analyte. Different ones of the sensors may be functionalized using different capture reagents for detecting different target analytes. Further details regarding an example design of particular bioFETs are provided below. The bioFETs may be arranged in a plurality of rows and columns, forming a 2-dimensional array of sensors. In some embodiments, each row of bioFETs is functionalized using a different capture reagent. In some embodiments, each column of bioFETs is functionalized using a different capture reagent. In some embodiments, different sectors of the 2-dimensional array are functionalized with different capture reagents.

Controller 108 may include one or more processing devices, such as a microprocessor, and may be programmable to control the operation of readout circuit 106 and/or sensor array 102. The details of controller 108 itself are not important for the understanding of the embodiments described herein. However, the various electrical signals that may be sent and received from sensor array 102 will be discussed in more detail below.

Dual Gate Back-Side FET Sensors

Embodiments described herein relate to measuring signals from one or more bioFET sensors, or arrays of bioFET sensors, in a differential manner to reduce common noise between the bioFET sensors. Accomplishing this goal involves controlling the fluid delivery to two separate bioFET sensors, or arrays of bioFET sensors, and differentially reading out the measured signals from each of the bioFET sensors, or arrays of bioFET sensors. This particular section describes an example bioFET sensor design that may be used in the embodiments of the present application.

One example type of bioFET sensor that may be used in sensor array 102 is the dual gate back-side FET sensor. Dual gate back-side FET sensors utilize semiconductor manufacturing techniques and biological capture reagents to form arrayed sensors. While MOSFETs can have a single gate electrode connected to a single electrical node, the dual gate back-side sensing FET sensor has two gate electrodes, each of which is connected to a different electrical node. A first one of the two gate electrodes is referred to herein as a "front-side gate," and the second one of the two gate electrodes is referred to herein as a "back-side gate." Both the front-side gate and the back-side gate are configured such that, in operation, each one may be electrically charged and/or discharged and thereby each influences the electric field between the source/drain terminals of the dual gate back-side sensing FET sensor. The front-side gate is electrically conductive, separated from a channel region by a front-side gate dielectric, and configured to be charged and discharged by an electrical circuit to which it is coupled. The back-side gate is separated from the channel region by a back-side gate dielectric and includes a bio-functionalized sensing layer disposed on the back-side gate dielectric. The amount of electric charge on the back-side gate is a function of whether a bio-recognition reaction has occurred. In the operation of dual gate back-side sensing FET sensors, the front-side gate is charged to a voltage within a predetermined range of voltages. The voltage on the front-side gate determines a corresponding conductivity of the FET sensor's channel region. A relatively small amount of change to the electric charge on the back-side gate changes the conductivity of the channel region. It is this change in conductivity that indicates a bio-recognition reaction.

One advantage of FET sensors is the prospect of label-free operation. Specifically, FET sensors enable the avoidance of costly and time-consuming labeling operations such as the labeling of an analyte with, for instance, fluorescent or radioactive probes.

Figure 2:
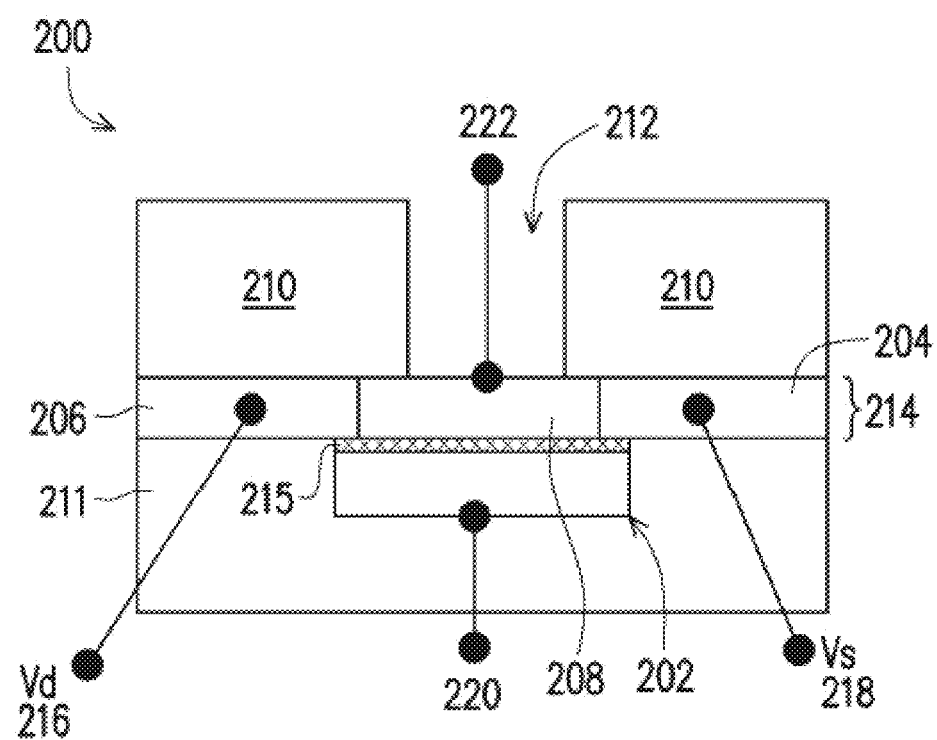
FIG. 2 illustrates a cross-sectional view of an exemplary dual-gate back-side sensing FET sensor, according to some embodiments.

FIG. 2 illustrates an exemplary dual gate back-side sensing FET sensor 200, according to some embodiments. Dual gate back-side sensing FET sensor 200 includes a control gate 202 formed on a surface of substrate 214 and separated therefrom by an intervening dielectric 215 disposed on substrate 214. An interconnect region 211 including a plurality of interconnect layers may be provided over one side of substrate 214. Substrate 214 includes a source region 204, a drain region 206, and a channel region 208 between source region 204 and drain region 206. In some embodiments, substrate 214 has a thickness between about 100 nm and about 130 nm. Gate 202, source region 204, drain region 206, and channel region 208 may be formed using suitable CMOS process technology. Gate 202, source region 204, drain region 206, and channel region 208 form a FET. An isolation layer 210 is disposed on the opposing side of substrate 214 from gate 202. In some embodiments, isolation layer 210 has a thickness of about 1 µm. In this disclosure the side of substrate 214 over which gate 202 is disposed is referred to as the "front-side" of substrate 214. Similarly, the side of substrate 214 on which isolation layer 210 is disposed is referred to as the "back-side."

An opening 212 is provided in isolation layer 210. Opening 212 may be substantially aligned with gate 202. In some embodiments, opening 212 is larger than gate 202 and may extend over multiple dual gate back-side sensing FET sensors. An interface layer (not shown) may be disposed in opening 212 on the surface of channel region 208. The interface layer may be operable to provide an interface for positioning and immobilizing one or more receptors for detection of biomolecules or bio-entities. Further details regarding the interface layer are provided herein.

Dual gate back-side sensing FET sensor 200 includes electrical contacts 216 and 218 to drain region 206 and source region 204, respectively. A front-side gate contact 220 may be made to gate 202, while a back-side gate contact 222 may be made to channel region 208. It should be noted that back-side gate contact 222 does not need to physically contact substrate 214 or any interface layer over substrate 214. Thus, while a FET can use a gate contact to control conductance of the semiconductor between the source and drain (e.g., the channel), dual gate back-side sensing FET sensor 200 allows receptors formed on a side opposing gate 202 of the FET device to control the conductance, while gate 202 provides another region to control the conductance. Therefore, dual gate back-side sensing FET sensor 200 may be used to detect one or more specific biomolecules or bio-entities in the environment around and/or in opening 212, as discussed in more detail using various examples herein.

Dual gate back-side sensing FET sensor 200 may be connected to: additional passive components such as resistors, capacitors, inductors, and/or fuses; other active components, including p-channel field effect transistors (PFETs), n-channel field effect transistors (NFETs), metal-oxide-semiconductor field effect transistors (MOSFETs), high voltage transistors, and/or high frequency transistors; other suitable components; or combinations thereof. It is further understood that additional features can be added in dual gate back-side sensing FET sensor 200, and some of the features described can be replaced or eliminated, for additional embodiments of dual gate back-side sensing FET sensor 200.

Figure 3:
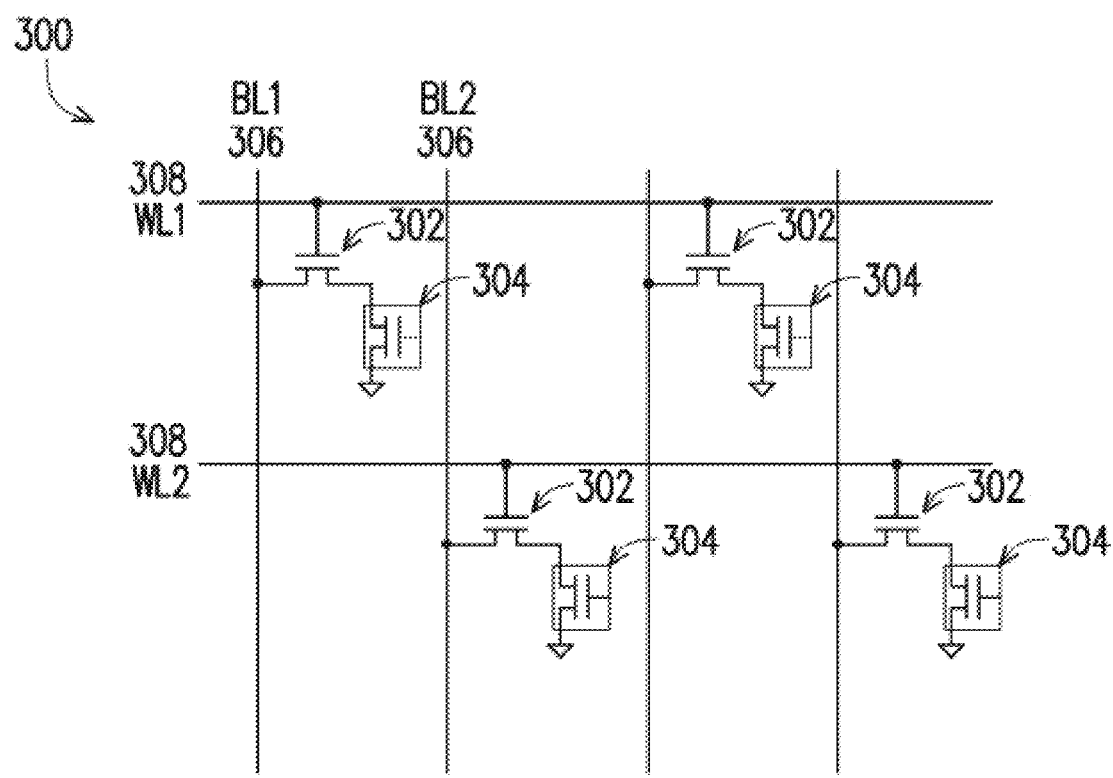
FIG. 3 is a circuit diagram of a plurality of FET sensors configured in an exemplary addressable array, according to some embodiments.

FIG. 3 illustrates a schematic of a portion of an exemplary addressable array 300 of bioFET sensors 304 connected to bit lines 306 and word lines 308. It is noted that the terms bit lines and word lines are used herein to indicate similarities to array construction in memory devices, however, there is no implication that memory devices or a storage array necessarily be included in the array. Addressable array 300 may have similarities to that employed in other semiconductor devices such as dynamic random access memory (DRAM) arrays. For example, dual gate back-side sensing FET sensor 200, described above with reference to FIG. 2, may be formed in a position that a capacitor would be found in a DRAM array. Schematic 300 is exemplary only and one would recognize other configurations are possible.

BioFET sensors 304 may each be substantially similar to dual gate back-side sensing FET sensor 200 according to some embodiments. FETs 302 are configured to provide an electrical connection between a drain terminal of bioFET sensor 304 and bit line 306. In this way, FETs 302 are analogous to access transistors in a DRAM array. In some embodiments, bioFET sensors 304 are dual gate back-side sensing FET sensors and each include a sensing gate provided by a receptor material disposed on a dielectric layer overlying a FET channel region disposed at a reaction site, and a control gate provided by a gate electrode (e.g., polysilicon) disposed on a dielectric layer overlying the FET channel region.

Addressable array 300 shows an array formation designed to detect small signal changes provided by biomolecules or bio-entities introduced to bioFET sensors 304. The arrayed format using bit lines 306 and word lines 308 allows for a smaller number of input/output pads since common terminals of different FETs in the same row or column are tied together. Amplifiers may be used to enhance the signal strength to improve the detection ability of the device having the circuit arrangement of schematic 300. In some embodiments, when voltage is applied to particular word lines 308 and bit lines 306, the corresponding access transistors 302 will be turned ON (e.g., like a switch). When the gate of the associated bioFET sensor 304 (e.g., such as back-side gate 222 of the dual gate back-side sensing FET sensor 200) has its charge affected by the bio-molecule presence, a threshold voltage of bioFET sensor 304 is changed, thereby modulating the current (e.g., $I_{ds}$) for a given voltage applied to back-side gate 222. The change of the current (e.g., $I_{ds}$) or threshold voltage (Vt) can serve to indicate detection of the relevant biomolecules or bio-entities.

Figure 4:
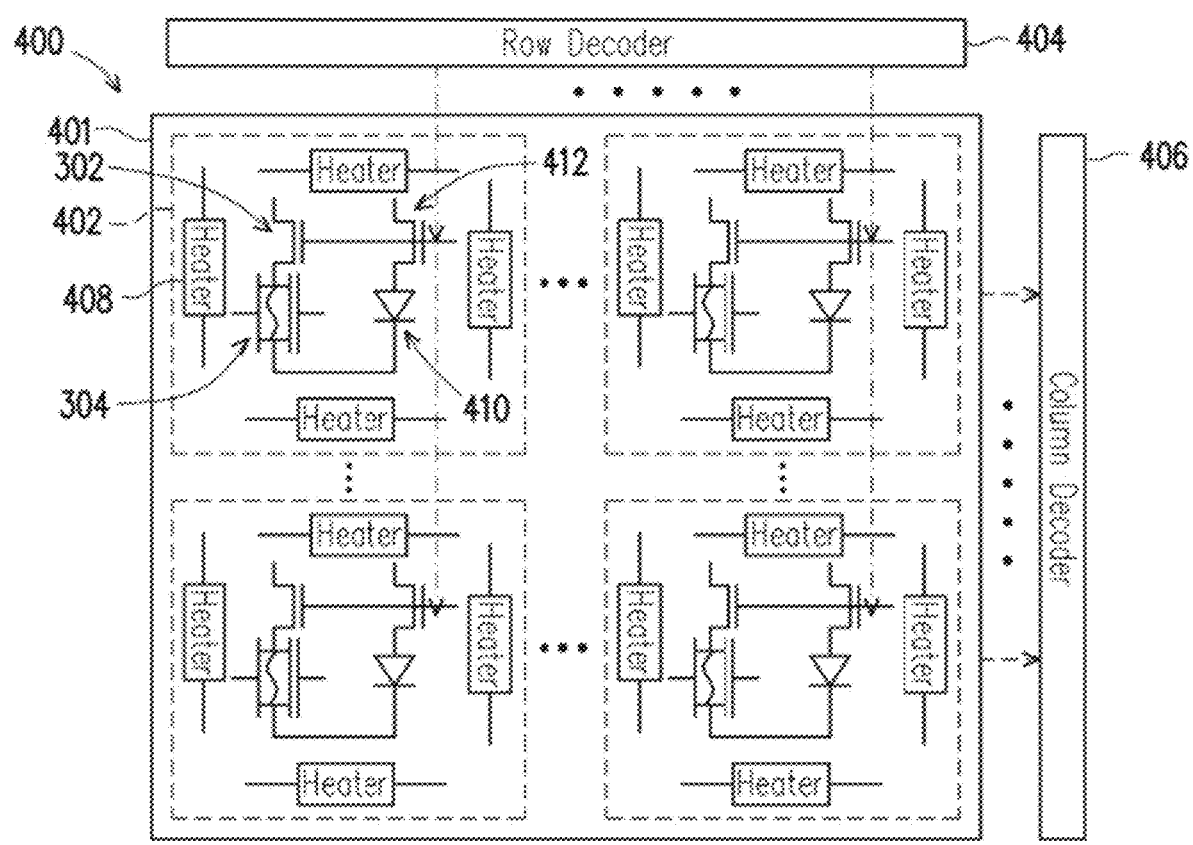
FIG. 4 is a circuit diagram of an exemplary addressable array of dual gate FET sensors and heaters, according to some embodiments.

Referring to FIG. 4, an exemplary schematic 400 is presented. Exemplary schematic 400 includes access transistor 302 and bioFET sensor 304 arranged as an array 401 of individually addressable pixels 402. Array 401 may include any number of pixels 402. For example, array 401 may include 128×128 pixels. Other arrangements may include 256×256 pixels or non-square arrays such as 128× 256 pixels.

Each pixel 402 includes access transistor 302 and bioFET sensor 304 along with other components that may include one or more heaters 408 and a temperature sensor 410. In this example, access transistor 302 is an n-channel FET. An n-channel FET 412 may also act as an access transistor for temperature sensor 410. In some embodiments, the gates of FETs 302 and 412 are connected, though this is not required.

Each pixel 402 (and its associated components) may be individually addressed using column decoder 404 and row decoder 406. In some embodiments, each pixel 402 has a size of about 10 micrometers by about 10 micrometers. In some embodiments, each pixel 402 has a size of about 5 micrometers by about 5 micrometers or has a size of about 2 micrometers by about 2 micrometers.

Column decoder 406 and row decoder 404 may be used to control the ON/OFF state of both n-channel FETs 302 and 412 (e.g., voltage is applied to the gates of FETs 302 and 412 together, and voltage is applied to the drain regions of FETs 302 and 412 together). Turning ON n-channel FET 302 provides a voltage to an S/D region of bioFET sensor 304. When bioFET sensor 304 is ON, a current $I_{ds}$ flows through bioFET sensor 304 and may be measured.

Heater 408 may be used to locally increase a temperature around bioFET sensor 304. Heater 408 may be constructed using any known technique, such as forming a metal pattern with a high current running through it. Heater 408 may also be a thermoelectric heater/cooler, like a Peltier device. Heater 408 may be used during certain biological tests such as to denature DNA or RNA or to provide a binding environment for certain biomolecules. Temperature sensor 410 may be used to measure the local temperature around bioFET sensor 304. In some embodiments, a control loop may be created to control the temperature using heater 408 and the feedback received from temperature sensor 410. In some embodiments, heater 408 may be a thermoelectric heater/cooler that allows for local active cooling of the components within pixel 402.

Figure 5:
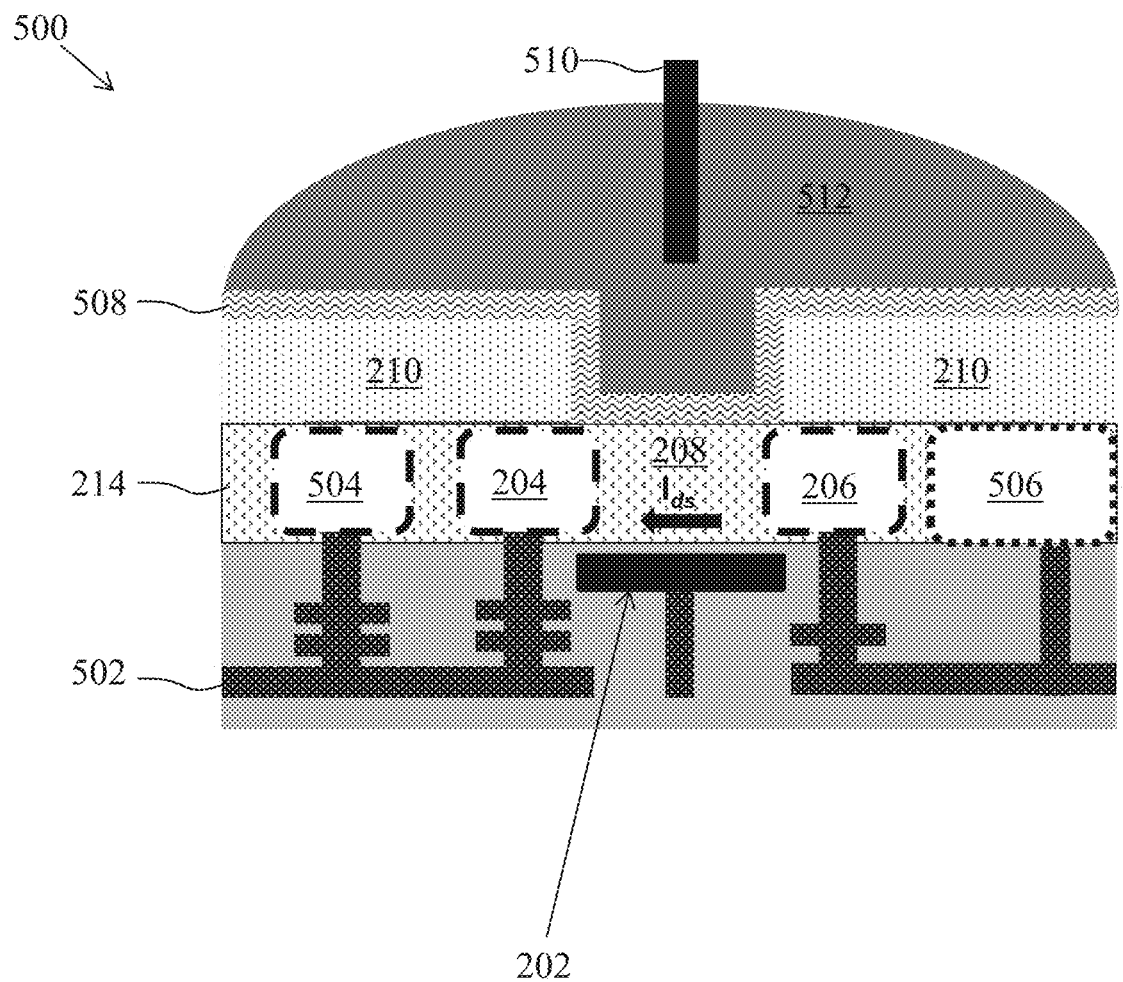
FIG. 5 illustrates a cross-sectional view of an exemplary dual gate back-side sensing FET sensor, according to some embodiments.

Referring to FIG. 5, a cross section of an example dual gate back-side sensing FET sensor 500 is provided, according to some embodiments. The dual gate back-side sensing FET sensor 500 is one implementation of dual gate back-side sensing FET sensor 200. Thus previously described elements from FIG. 2 are labeled with element numbers from FIG. 2 and their descriptions are not repeated here. Dual gate back-side sensing FET sensor 500 includes gate 202, source region 204, drain region 206, and channel region 208, where source region 204 and drain region 206 are formed within substrate 214. Gate 202, source region 204, drain region 206, and channel region 208 form a FET. It should be noted that the various components of FIG. 3A are not intended to be drawn to scale and are exaggerated for visual convenience, as would be understood by a person skilled in the relevant art.

In some embodiments, dual gate back-side sensing FET sensor 500 is coupled to various layers of metal interconnects 502 that make electrical connection with the various doped regions and other devices formed within substrate 214. Metal interconnects 502 may be manufactured using fabrication processes well known to a person skilled in the relevant art.

Dual gate back-side FET sensor 500 may include a body region 504 separate from source region 204 and drain region 206. Body region 504 may be used to bias the carrier concentration in channel region 208 between source region 204 and drain region 206. In some embodiments, a negative voltage bias may be applied to body region 504 to improve the sensitivity of dual gate back-side FET sensor 500. In some embodiments, body region 504 is electrically connected to source region 204. In some embodiments, body region 504 is electrically grounded.

Dual gate back-side FET sensor 500 may be coupled to additional circuitry 506 fabricated within substrate 214. Circuitry 506 may include any number of MOSFET devices, resistors, capacitors, and/or inductors to form circuitry to aid in the operation of dual gate back-side sensing FET sensor 500. Circuitry 506 may represent a readout circuit used to measure a signal from dual gate back-side FET sensor 500 that is indicative of analyte detection. Circuitry 506 may include amplifiers, analog to digital converters (ADCs), digital to analog converters (DACs), voltage generators, logic circuitry, and/or DRAM memory, to name a few examples. In some embodiments, circuitry 506 includes digital components and does not measure an analog signal from dual gate back-side FET sensor 500. All or some of the components of additional circuitry 506 may be integrated in the same substrate 214 as dual gate back-side FET sensor 500. It should be understood that many FET sensors, each substantially similar to dual gate back-side FET sensor 500, may be integrated in substrate 214 and coupled to additional circuitry 506. In another example, all or some of the components of additional circuitry 506 are provided on another semiconductor substrate separate from substrate 214. In yet another example, some components of additional circuitry 506 are integrated in the same substrate 214 as dual gate back-side FET sensor 500, and some components of additional circuitry 506 are provided on another semiconductor substrate separate from substrate 214.

Still referring to the illustrative example of FIG. 5, dual gate back-side sensing FET sensor 500 includes an interface layer 508 deposited over isolation layer 210 and within the opening over channel region 208. In some embodiments, interface layer 508 has a thickness between about 20 Å and about 40 Å. Interface layer 508 may be a high-K dielectric material, such as hafnium silicate, hafnium oxide, zirconium oxide, aluminum oxide, tantalum pentoxide, hafnium dioxide-alumina ($HfO_2$—$Al_2O_3$) alloy, or any combinations thereof. Interface layer 508 may act as a support for the attachment of capture reagents as will be discussed in more detail later in the section directed to biological sensing. A solution 512 is provided over the reaction site of dual gate back-side sensing FET sensor 500, and a fluid gate 510 is placed within solution 512. Solution 512 may be a buffer solution containing capture reagents, target analytes, wash solution, or any other biological or chemical species.

An example operation of dual gate back-side FET sensor 500 as a pH sensor will now be described with reference to FIG. 5.

Briefly, a fluid gate 510 is used to provide an electrical contact to the "back gate" of dual gate back-side FET sensor 500. A solution 512 is provided over the reaction site of dual gate back-side FET sensor 500, and fluid gate 510 is placed within solution 512. The pH of the solution is generally related to the concentration of hydrogen ions [$H^+$] in the solution. The accumulation of the ions near the surface of interface layer 508 above channel region 208 affects the formation of the inversion layer within channel region 208 that forms the conductive pathway between S/D regions 204 and 206. In some embodiments, a current $I_{ds}$ flows from one S/D region to the other.

The current $I_{ds}$ may be measured to determine the pH of solution 512. In some embodiments, fluid gate 510 is used as the gate of the transistor during sensing while gate 202 remains floating. In some embodiments, fluid gate 510 is used as the gate of the transistor during sensing while gate 202 is biased at a given potential. For example, gate 202 may be biased at a potential between −2V and 2V depending on the application, while fluid gate 510 is swept between a range of voltages. In some embodiments, fluid gate 510 is biased at a given potential (or grounded) while gate 202 is used as the gate of the transistor (e.g., its voltage is swept across a range of potentials) during sensing. Fluid gate 510 may be formed from platinum or may be formed from any other commonly used material(s) for reference electrodes in electrochemical analysis. An example of a reference electrode is a silver/silver chloride (Ag/AgCl) electrode, which has a stable potential value of about 0.230 V.

Figure 6A:
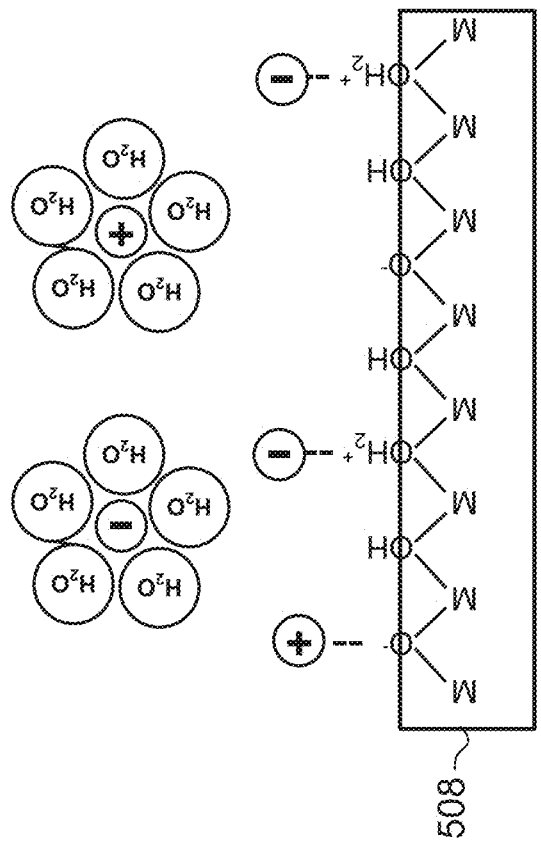
FIGS. 6A and 6B illustrate using the dual gate back-side sensing FET sensor as a pH sensor, according to some embodiments.

FIG. 6A shows ions in solution binding to a surface of interface layer 508. A top-most atomic layer of interface layer 508 is depicted as the various dangling [$O^-$], [OH], and [$OH_2^+$] bonds. As the ions accumulate on the surface, the total surface charge affects the threshold voltage of the transistor. As used herein, the threshold voltage is the minimum potential between the gate and the source of a FET sensor that is required to form a conductive path of minority carriers between the source and the drain of the FET sensor. The total charge also directly relates to a pH of the solution, as a higher accumulation of positive charge signifies a lower pH while a higher accumulation of negative charge signifies a higher pH.

Figure 6B:
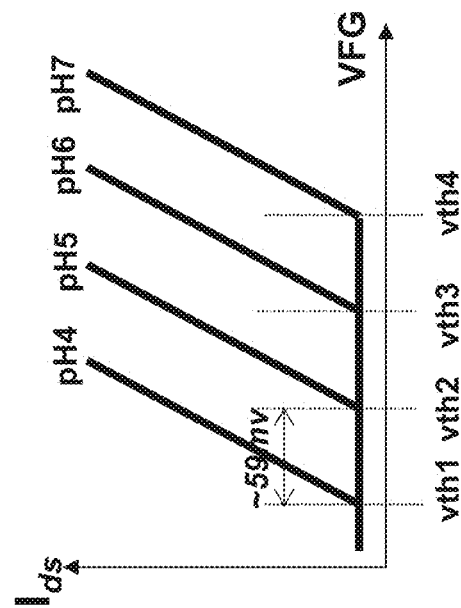

FIG. 6B illustrates an example change in threshold voltage that results due to different pH values in an n-channel FET sensor. As can be observed in this example, a 59 mV increase in threshold voltage roughly signifies an increase of one in the pH of the solution. In other words, one pH change results in total surface charge equivalent of 59 mV when measured as the voltage required to turn ON the transistor.

Changing the threshold voltage of dual gate back-side FET sensor 500 also changes a time it takes to form a conductive path between S/D regions 204 and 206 for a given voltage input to either fluid gate 510 or gate 202. This time delay in "turning ON" the FET sensor may be quantified using digital circuitry and used to determine an analyte concentration, according to some embodiments.

Figure 7:
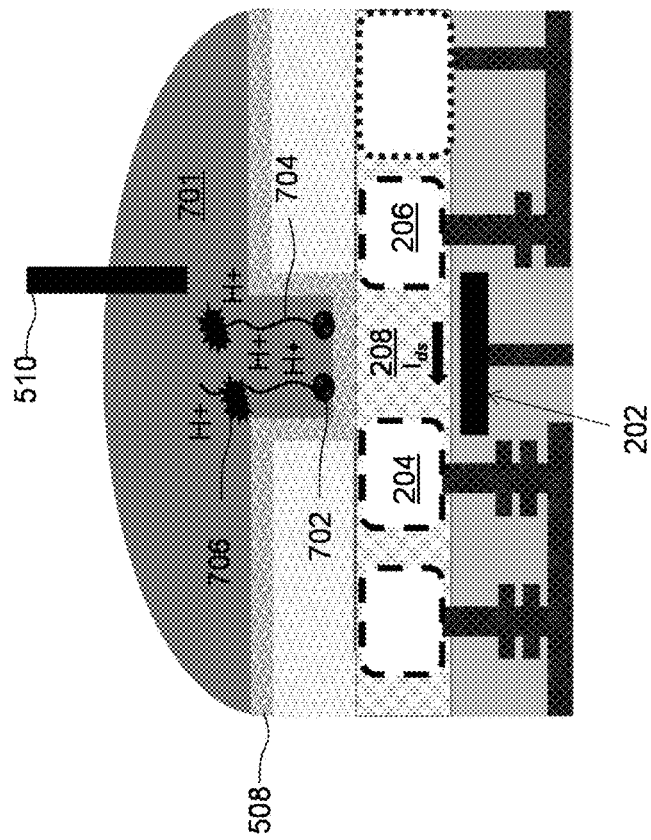
FIG. 7 illustrates a cross-sectional view of an exemplary dual gate back-side sensing bioFET detecting the presence of cells or other microorganisms, according to some embodiments.

FIG. 7 illustrates an example biosensing test using dual gate back-side FET sensor 500 to determine the local concentration of captured cells, according to some embodiments. Capture reagents 704 may be bound to dielectric layer 508 using a linking molecule 702. Linking molecule 702 may have a reactive chemical group that binds to a portion of dielectric layer 508. An example of linking molecules include thiols. Linking molecules may also be formed via silanization of the surface of dielectric layer 508, or by exposing the surface of dielectric layer 508 to ammonia ($NH_3$) plasma, to form reactive $NH_2$ groups on the surface. The silanization process involves sequentially exposing the surface of dielectric layer 508 to different chemicals to build up covalently-bound molecules on the surface of dielectric layer 508, as would be generally understood by a person skilled in the relevant art. Capture reagents 704 may include antibodies that bind to proteins on the outer surface of target cells 706 to be captured.

Figure 8:
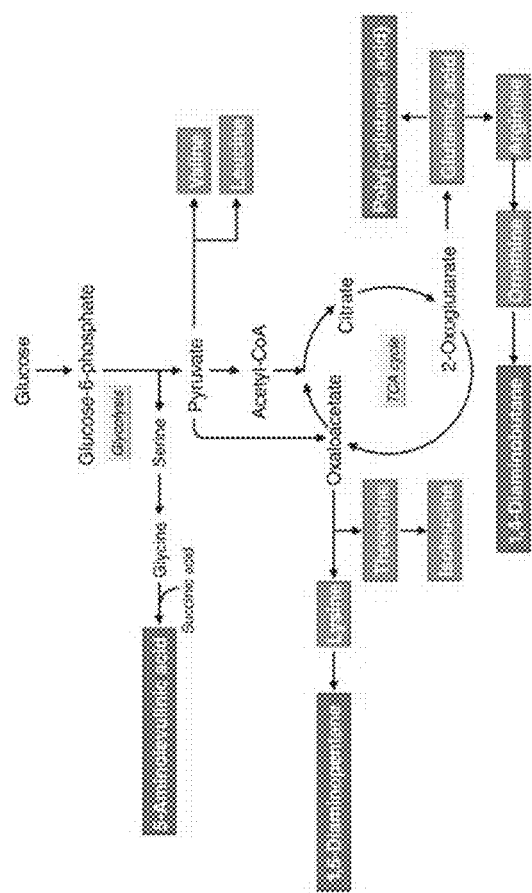
FIG. 8 illustrates an example metabolic pathway for glucose.

According to some embodiments, target cells 706 produce chemicals that may alter the pH of the surrounding solution, which can be detected by bioFET sensor 500 as discussed above with reference to FIGS. 6A and 6B. In other embodiments, a solution 701 is introduced that includes a substrate material, such as glucose, that is broken down by enzymes within target cells 706 to produce certain by-products. Examples by-products may be acidic metabolic products produced by the glycolysis of glucose and the citric acid cycle (TCA). One specific example of these acidic metabolic products is poly(γ-glutamic acid), which is positively charged, thus changing the pH of the surrounding solution and signaling the presence of target cells 706. The entire chemical pathway diagraming the breakdown of glucose ultimately to produce poly(γ-glutamic acid) is illustrated in FIG. 8. It should be understood that other chemical pathways to produce other pH-altering by-products can be used as well.

BioFET Array Embodiments

Figure 9:
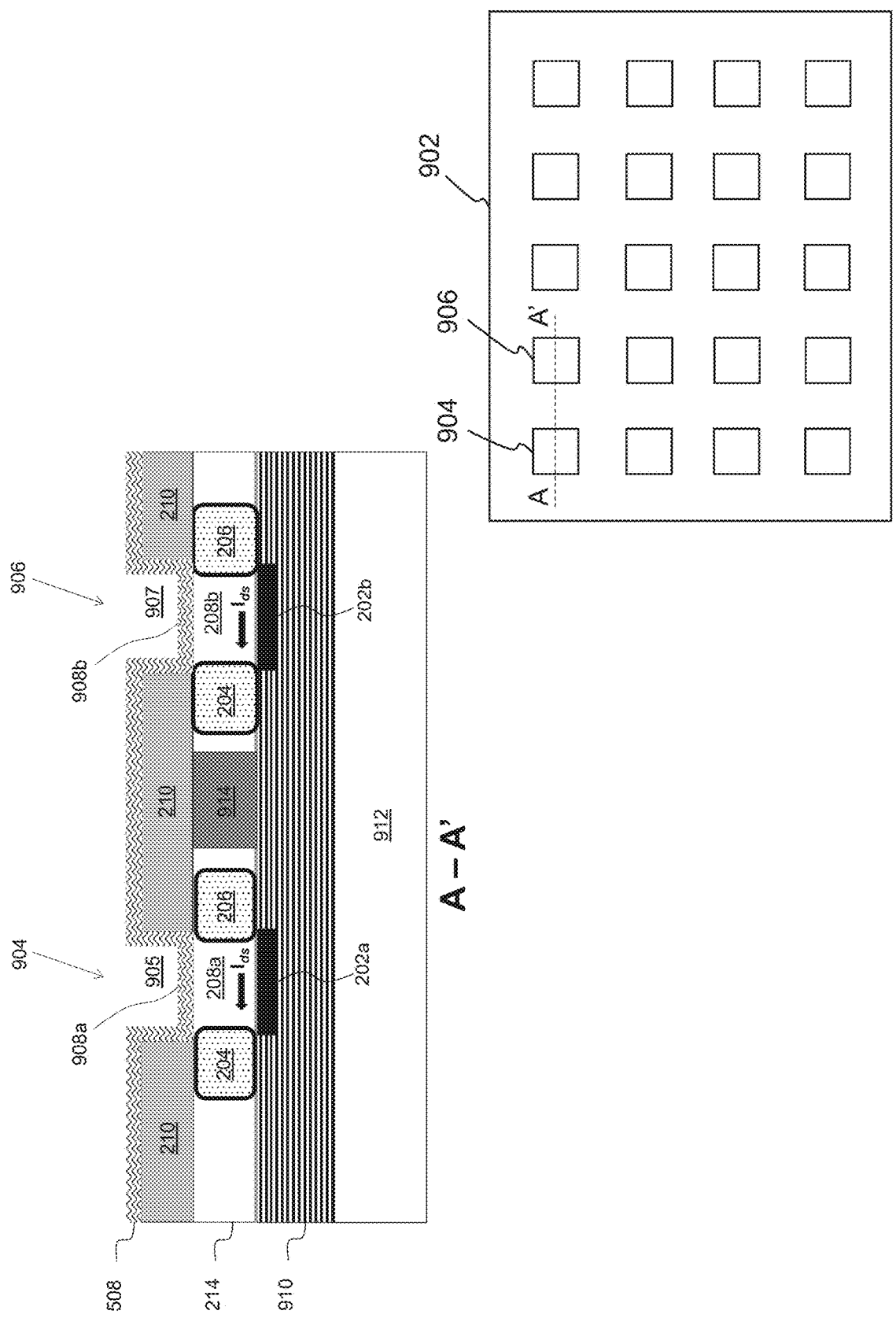
FIG. 9 illustrates a sensing array of FET sensors, according to some embodiments.

FIG. 9 illustrates a top-down view of an example sensor array 902 having a plurality of bioFET sensors arranged in a repeating pattern. The bioFET sensors arranged in sensor array 902 may each be examples of FET sensor 500 described above with reference to FIG. 5. A cross-section view taken across bioFET sensors 904 and 906 is illustrated in the upper left of the figure. Although only a certain number of bioFET sensors are illustrated in sensor array 902, it should be understood that sensor array 902 may include any number of bioFET sensors and that the arrangement of sensors is not limited to organized rows and columns.

Each of bioFET sensors 904 and 906 include corresponding wells 905 and 907 that may be patterned by forming an opening through a thickness of isolation layer 210. According to some embodiments, each well in sensor array 902 is substantially aligned over a channel region of a corresponding dual gate back-side sensing FET sensor. In the illustrated example, well 905 is aligned over channel region 208a of bioFET sensor 904 and well 907 is aligned over channel region 208b of bioFET sensor 906. According to some embodiments, each of the patterned wells across sensor array 906 has a size anywhere between 500 nm×500 nm and 500 μm×500 μm. Sizes of the patterned wells between these dimensions can help to minimize a trade-off between effective sensing by each bioFET sensor and the number of different target analytes detected by sensor array 902. According to some embodiments, the spacing between each of the wells across sensor array 906 is between 1 μm and 1 mm. Although not explicitly illustrated in FIG. 9 for clarity, sensor array 902 may also include a microfluidic channel coupled to its surface, such that fluid can be delivered via the microfluidic channel to each of the bioFET sensors in sensor array 902.

BioFET sensor 904 includes a dielectric layer 908a patterned within well 905 and over channel region 208a. BioFET sensor 906 similarly includes a dielectric layer 908b patterned within well 907 and over channel region 208b. Dielectric layers 908a and 908b may be portions of the same deposited dielectric layer, or may be layers having the same material composition but deposited at different times. In other embodiments, dielectric layers 908a and 908b include different materials.

Other components of sensor array 902 include a plurality of interconnect layers (not shown) to make electrical connection to source/drain regions 204/206 and gates of each of the bioFET sensors in the array. In the illustrated example, gates 202a and 202b are formed over a surface of channel region 208a and 208b, respectively. According to some embodiments, gates 202a and 202b are formed on a surface of channel region 208a and 208b that is opposite to the surface of channel region 208a and 208b having dielectric layer 908a and 908b. Any surfaces of channel region 208a and 208b should also be understood to be surfaces of semiconductor substrate 214. According to some embodiments, a carrier substrate 612 is included to provide mechanical stability and stiffness to sensor array 902.

In some embodiments, isolation regions 914 are formed between adjacent bioFET sensors to reduce electrical crosstalk between the sensors. Isolation regions 914 may represent standard shallow trench isolation (STI) structures filled with oxide.

Each bioFET sensor of sensor array 902 may be individually addressable such that sensing can occur independently at any of the bioFET sensors in the array. In this way, multiple various analytes can be detected using the same sensor array 902 having different capture reagents bound to the dielectric layer of different bioFET sensors.

Figure 10:
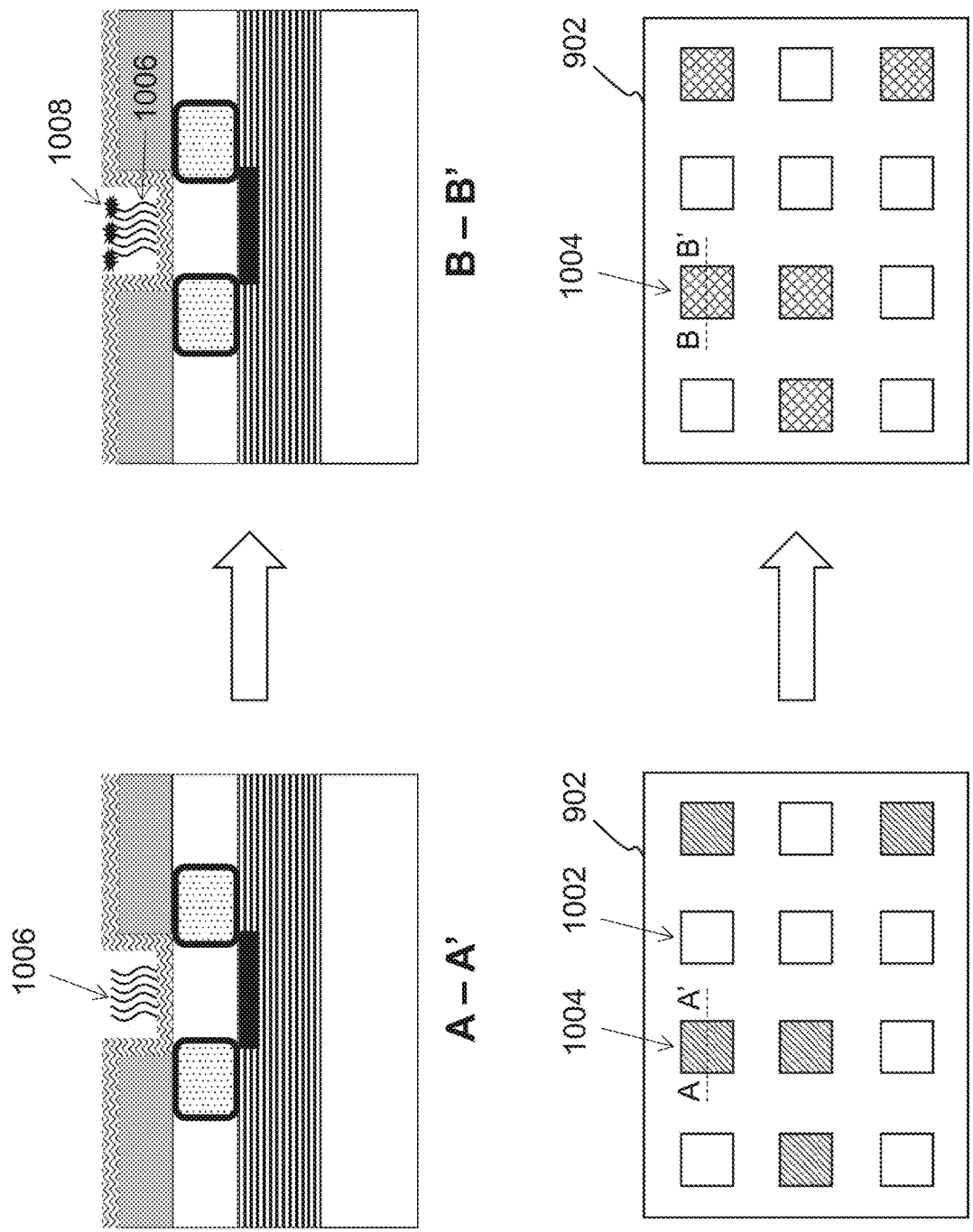
FIG. 10 illustrates capturing analytes using a sensing array, according to some embodiments.

FIG. 10 illustrates sensor array 902 having some of the bioFET sensors include capture reagents while other bioFET sensors do not. For example, bioFET sensor 1002 does not include any capture reagents while bioFET sensor 1004 includes capture reagents 1006 bound to its corresponding dielectric layer (as seen in the cross section taken across the line A-A'). Any number of bioFET sensors in sensor array 902 can be functionalized with capture reagents 1006, and similarly, any number of bioFET sensors in sensor array 902 have no capture reagents. In some embodiments, the bioFET sensors having no capture reagents may be used to provide control signals against those bioFET sensors that do have capture reagents 1006. Capture reagents 1006 may be deposited over portions of sensor array 902 using various possible techniques, one example of which is described later with reference to FIG. 10.

Once capture reagents 1006 have been disposed on various bioFET sensors, a target solution containing a target analyte 1008 to be detected or counted may be introduced over sensor array 902. For example, target analyte 1008 may include particular cells, like cancer cells, that bind to capture reagents 1006 as illustrated in the cross section B-B' taken across bioFET sensor 1004 after the target solution has been applied. In other examples, target analyte 1008 includes any other type of microorganism. The number, or density, of target analyte 1008 bound to a particular bioFET sensor may be determined based on a change in the measured drain current of the bioFET sensor. The exact sensing methodology used for any given bioFET sensor is discussed later in more detail with reference to FIGS. 14-15.

Figure 11:
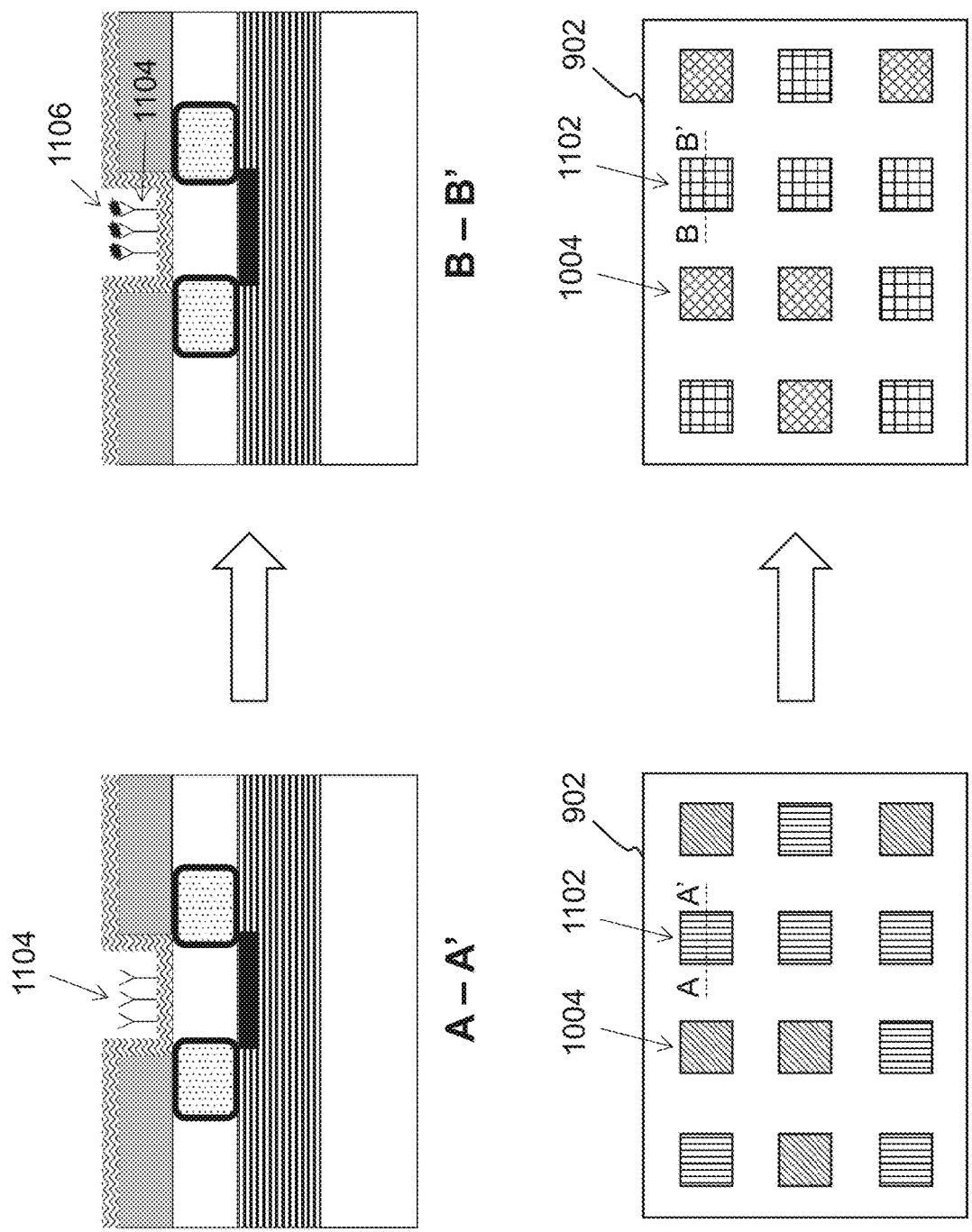
FIG. 11 illustrates capturing different analytes using a sensing array, according to some embodiments.

FIG. 11 illustrates an extension of the sensor array 902 illustrated in FIG. 10 by adding additional capture reagents bound to other bioFET sensors in the array. Specifically, bioFET sensor 1102 includes capture reagents 1104 that are different from capture reagents 1006 on bioFET sensor 1004 (as illustrated in FIG. 11.) Capture reagents 1104 may be designed to bind to different types of cells than capture reagents 1006. In other examples, capture reagents 1104 bind to any type of analyte that is different than an analyte that binds to capture reagents 1006. As illustrated in FIG. 11, a first plurality of bioFET sensors may be functionalized using capture reagents 1006 while a second plurality of bioFET sensors may be functionalized using capture reagents 1104.

According to an embodiment, a target solution is introduced over sensor array 902 that contains various analytes (e.g., different cell types or different microorganisms) which may bind either to capture reagents 1006 of bioFET sensor 1004, capture reagents 1104 of bioFET sensor 1102, or to neither set of capture reagents. In the illustrated example, target analyte 1106 binds to capture reagent 1104. Target analyte 1106 may include particular cells, like cancer cells, or any other type of microorganism. The number, or density, of target analyte 1106 bound to a particular bioFET sensor may be determined based on a change in the measured drain current of the bioFET sensor. The exact sensing methodology used for any given bioFET sensor is discussed later in more detail with reference to FIGS. 14-15. Due to the individually addressable nature of each bioFET sensor in sensor array 902, and the ability to dispose different capture reagents on different bioFET sensors in the array, the detection of multiple different analytes can occur simultaneously.

Detecting the presence of a given analyte may be used to provide a binary determination of whether or not the analyte is present in the target solution. In other embodiments, sensor array 902 is used to provide a general count, or concentration, of a given analyte in a target solution. In still other embodiments, sensor array 902 is used to monitor the continual growth of cells or microorganisms captured over a given bioFET sensor or plurality of bioFET sensors.

Figure 12:
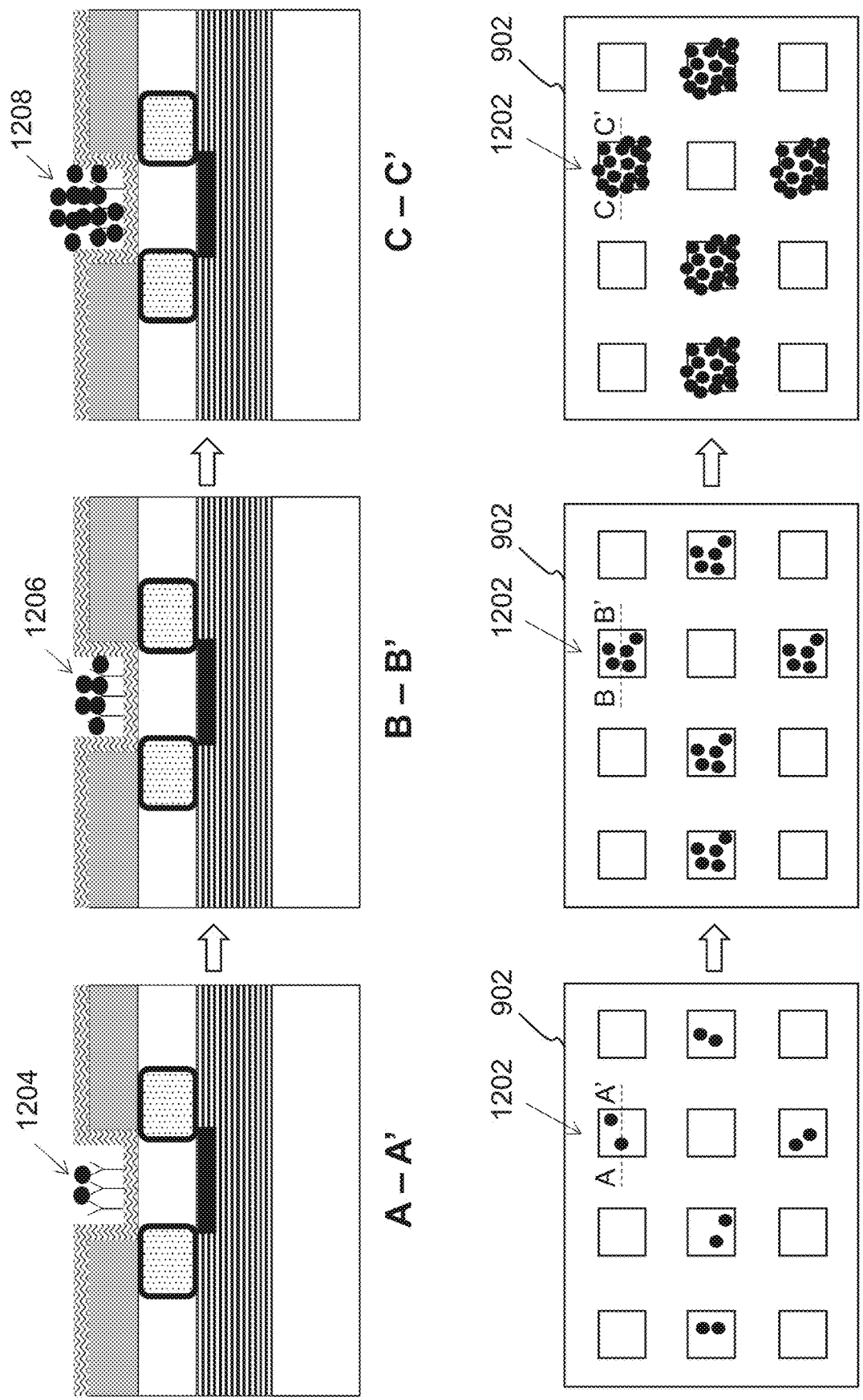
FIG. 12 illustrates monitoring cell growth using a sensing array, according to some embodiments.

FIG. 12 illustrates sensor array 902 being used to monitor the growth of cells or other microorganisms captured over given bioFET sensors in the array, according to some embodiments. BioFET sensor 1202 is one example of a plurality of bioFET sensors in sensor array 902 that have captured a first population of cells 1204 shown in the cross-section A-A' taken across bioFET sensor 902. First population of cells 1204 may be captured using specific capture reagents present at one or more of the bioFET sensors in sensor array 902.

Culture media may be provided over sensor array 902 to allow first population of cells 1204 to grow into second population of cells 1206 after a first time duration. Cross section B-B' taken across bioFET sensor 902 illustrates the higher population of cells that make up second population of cells 1206. According to an embodiment, the increased production of a positively charged by-product (such as poly(γ-glutamic acid)) from each of second population of cells 1206 can be detected by bioFET sensor 1202 as discussed above with reference to FIGS. 6-8. The measured increase in the drain current can be correlated to a growth rate or total population size of the target cells.

At a later time period, second population of cells 1206 grows into a higher third population of cells 1208 as shown in the cross-section C-C' take across bioFET sensor 1202. The same culture media may be used to continuously grow the cells from first population of cells 1204 to third population of cells 1208. In another example, the culture media is continuously flown over sensor array 902 such that is remains fresh. According to an embodiment, the measured drain current of bioFET sensor 1202 increases with a corresponding increase in the population size of the captured target cells. Depending on the type of cell being captured, the growth rate and corresponding change in the measured drain current may be different. Although this description focuses on the measurement of a single bioFET sensor 1202 in sensor array 902, it should be understood that multiple bioFET sensors of sensor array 902 may be measured together to provide a single signal indicative of the growth rate of the captured target cells at each of the multiple bioFET sensors. Furthermore, the growth rate of multiple different cell types can be monitored using the same sensor array 902 by disposing different capture reagents on different sets of bioFET sensors.

In some embodiments, specific capture reagents are not used on the bioFET sensors of sensor array 902, and instead cells are disposed over the surface of sensor array 902 and allowed to grow uninhibited over the surface of sensor array 902. In this way, sensor array 902 can be used to monitor how the cells spread across the surface of sensor array 902 as they grow over time using the bioFET sensors.

Figure 13:
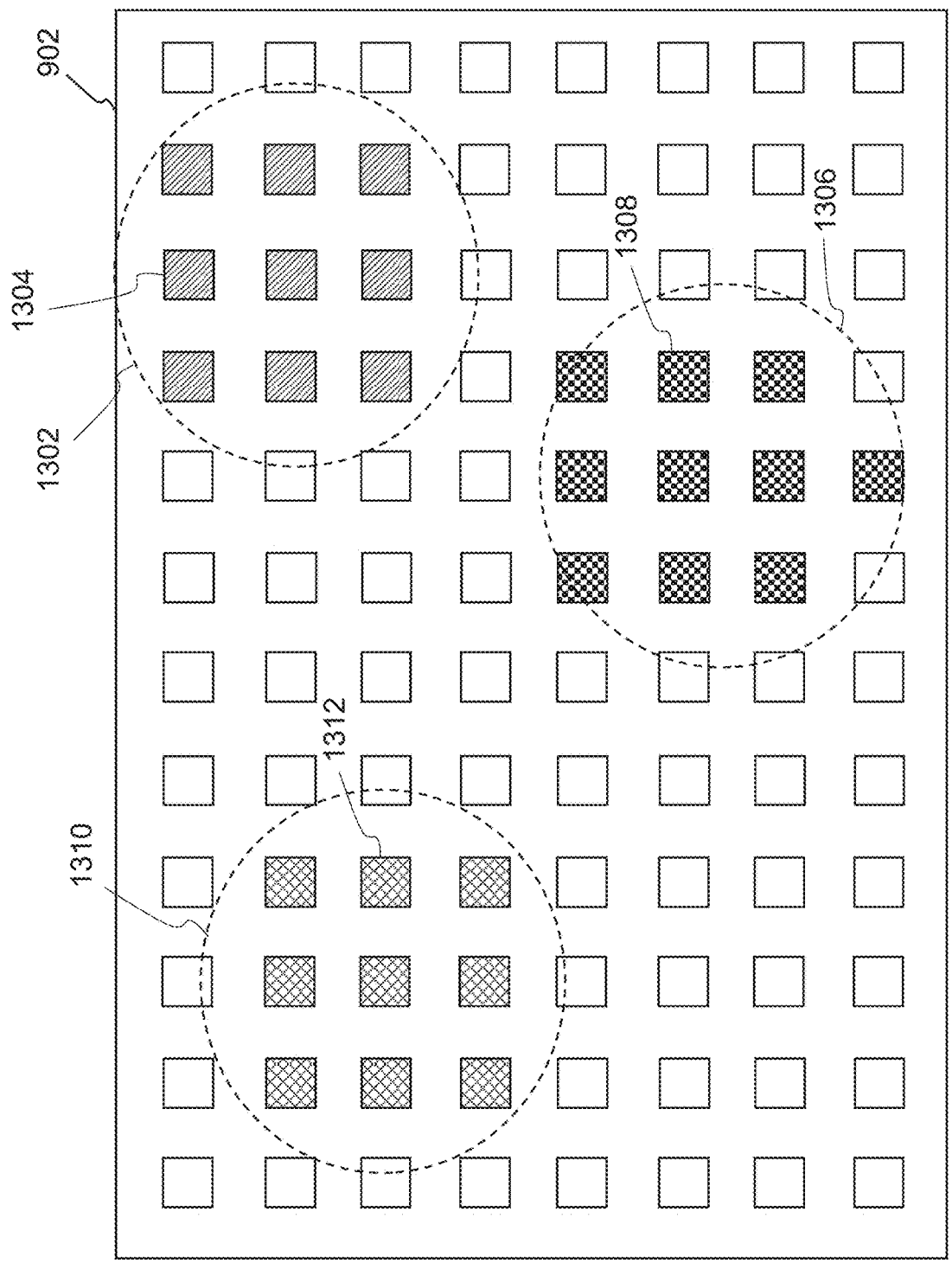
FIG. 13 illustrates disposing different capture reagents across a sensing array, according to some embodiments.

FIG. 13 includes another top-down view of sensor array 902 and illustrates the deposition of different fluid droplets to immobilize different capture reagents on different bioFET sensors, according to some embodiments. For example, a first fluid droplet 1302 may be deposited such that it covers a first plurality of bioFET sensors 1304. First fluid droplet 1302 may include a first plurality of capture reagents that bind to the dielectric layer of first plurality of bioFET sensors 1304. In one example, the first plurality of capture reagents include antibodies designed to bind to a particular type of cell or microorganism. A second fluid droplet 1306 may be deposited such that it covers a second plurality of bioFET sensors 1308. Second fluid droplet 1306 may include a second plurality of capture reagents different from the first plurality of capture reagents. The second plurality of capture reagents bind to the dielectric layer of second plurality of bioFET sensors 1308. In one example, the second plurality of capture reagents include antibodies designed to bind to another particular type of cell or microorganism different than that captured by first plurality of capture reagents. A third fluid droplet 1310 may be deposited such that it covers a third plurality of bioFET sensors 1312. Third fluid droplet 1310 may include a third plurality of capture reagents different from the first or second plurality of capture reagents. The third plurality of capture reagents bind to the dielectric layer of third plurality of bioFET sensors 1312. In one example, the third plurality of capture reagents include antibodies designed to bind to another particular type of cell or microorganism different than that captured by either first or second plurality of capture reagents. Any number of droplets may be used across the surface of sensor array 902 to dispose different capture reagents across different sets of bioFET sensors.

According to some embodiments, each of droplets 1302, 1306, and 1310 are deposited simultaneously across sensor array 902. In other embodiments, each of droplets 1302, 1306, and 1310 are disposed at different times. Each of droplets 1302, 1306, and 1310 may be left over their corresponding bioFET sensors for a given period of time to ensure that enough of the capture reagents bind to the bioFET sensors. Sensor array 902 may be washed using a buffer solution between the deposition of different droplets. According to some embodiments, the diameter of any one of droplets 1302, 1306, and 1310 is between 50 µm and 150 µm.

In some embodiments, the bioFET sensors of sensor array 902 can be arranged in other array configurations (e.g., staggered array configuration) instead of the linear array configuration shown in FIGS. 9-13. In some embodiments, bioFET sensors in a staggered array configuration can be used to accommodate a larger number of bioFET sensors than a linear array of bioFET sensors within the same area. In some embodiments, the bioFET sensors of sensor array 902 can be arranged in a beehive configuration instead of the linear array configuration shown in FIGS. 9-13.

Figure 14:
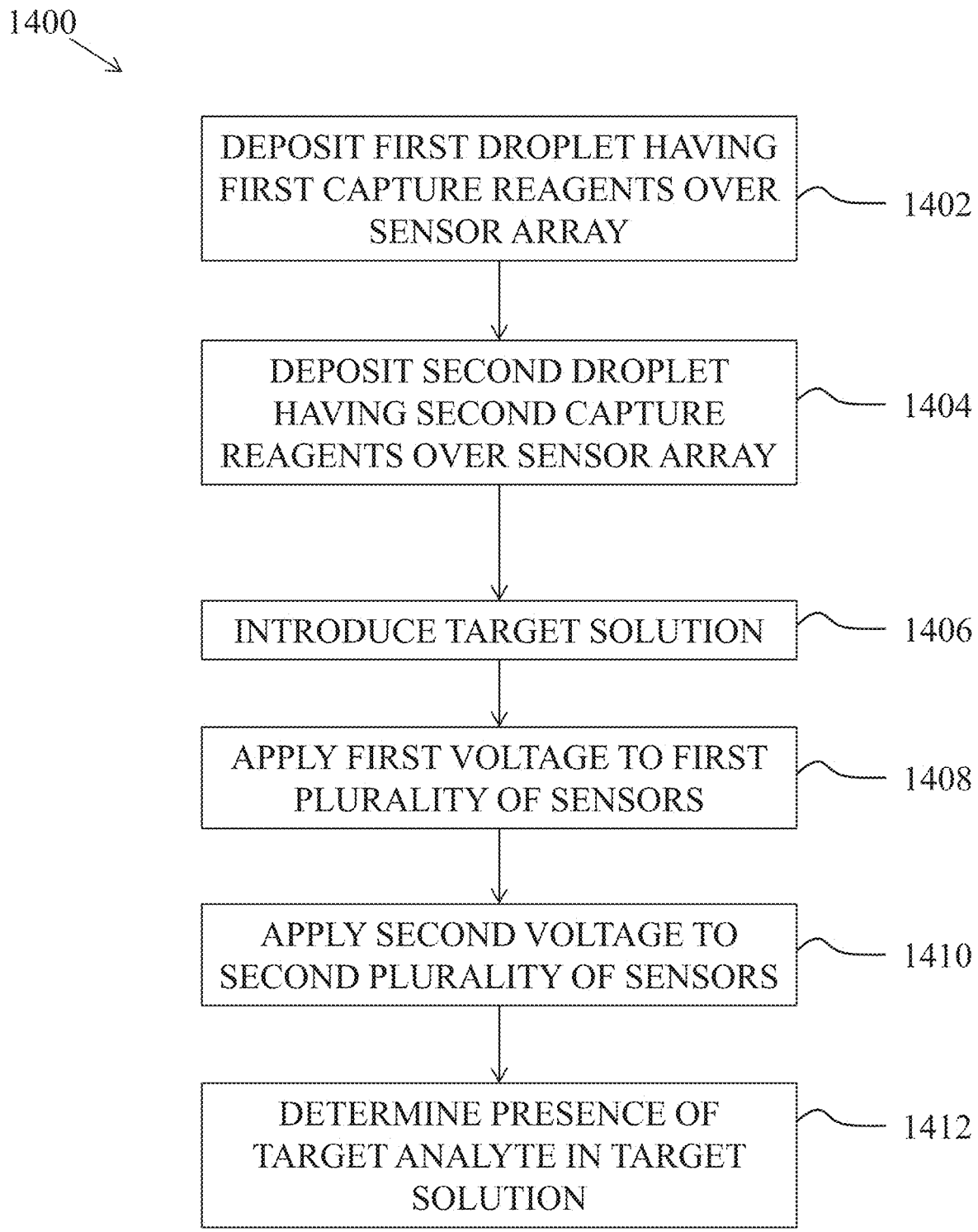
FIG. 14 illustrates a flowchart of an example method for performing sensing with a sensor array.

FIG. 14 illustrates an example method 1400 for using a sensor array to detect different target reagents, according to some embodiments. Each of the bioFET sensors in the sensor array may be a dual gate back-side FET sensor as illustrated in FIG. 5. It is understood that additional operations can be provided before, during, and after method 1400, and some of the steps described below can be replaced or eliminated, for additional embodiments of the method.

Method 1400 begins at block 1402 where a first fluid droplet is deposited over the sensor array. The first fluid droplet includes a first plurality of capture reagents, such as antibodies. The first plurality of capture reagents bind to the backside surface of a first plurality of bioFET sensors in the sensor array that are exposed to the first fluid droplet. The backside surface of each of the bioFET sensors may be within corresponding patterned wells across the surface of the sensor array. The first plurality of capture reagents in the first fluid droplet may bind to a dielectric layer deposited on the backside surface of each of the first plurality of bioFET sensors. The first fluid droplet may remain over the first plurality of bioFET sensors for a given period of time to ensure sufficient binding of the capture reagents.

Method 1400 then proceeds to block 1404 where a second fluid droplet is deposited over the sensor array. The second fluid droplet includes a second plurality of capture reagents, such as antibodies, that are different from the first plurality of capture reagents. The second plurality of capture reagents bind to the backside surface of a second plurality of bioFET sensors in the sensor array that are exposed to the second fluid droplet. The second plurality of bioFET sensors are each different than the first plurality of bioFET sensors such that the different capture reagents are not bound to the same bioFET sensor. The second plurality of capture reagents in the second fluid droplet may bind to a dielectric layer deposited on the backside surface of each of the second plurality of bioFET sensors. The second fluid droplet may remain over the second plurality of bioFET sensors for a given period of time to ensure sufficient binding of the capture reagents.

Method 1400 proceeds to block 1406 where target solution is provided over the sensor array, according to an embodiment. The target solution may be introduced by also dropping a droplet containing the target solution over various bioFET sensors in the sensor array. In another embodiment, the target solution is flown over the sensor array in a microfluidic channel coupled to the surface of the sensor array, such that both the first plurality of bioFET sensors and the second plurality of bioFET sensors in the sensor array are encompassed in the same microfluidic channel.

The target solution contains a plurality of target analytes, such as target cells or microorganisms. The target analytes may bind to either the first or second plurality of capture reagents to determine the presence of the target analytes in the target solution. For example, the measured drain current of corresponding bioFET sensors having the captured target analytes increases as the concentration of captured target analytes increases. Since multiple different capture reagents may be used across different bioFET sensors of the sensor array, multiple different target analytes can be sensed from a given target solution.

According to some embodiments, after the target analytes are bound to their corresponding capture reagents in the sensor array, another solution containing a substrate material, such as glucose, is introduced over the sensor array. Captured cells and other types of microorganisms can break down the glucose to create positively charged by-products, which can be measured by the corresponding bioFET sensors as a change in the drain current.

In block 1408, a first voltage is applied to the gates of the first plurality of bioFET sensors and the induced drain current is subsequently measured from the first plurality of bioFET sensors. Similarly, in block 1410, a second voltage is applied to the gates of the second plurality of bioFET sensors and the induced drain current is subsequently measured from the second plurality of bioFET sensors. The first and second applied voltages may have the same magnitude.

Method 1400 proceeds to block 1412 where a determination is made whether or not the target analyte is present at either the first or second plurality of bioFET sensors. As noted above, if the measured drain current of either the first or second plurality of bioFET sensors significantly increases above a baseline measurement (e.g., increases beyond changes caused by noise and standard measurement error), then it can be determined that the target analyte is present at the bioFET sensors exhibiting the increased drain current. This determination may simultaneously be made across all bioFET sensors in the sensor array to test for the presence of any number of target analytes.

Figure 15:
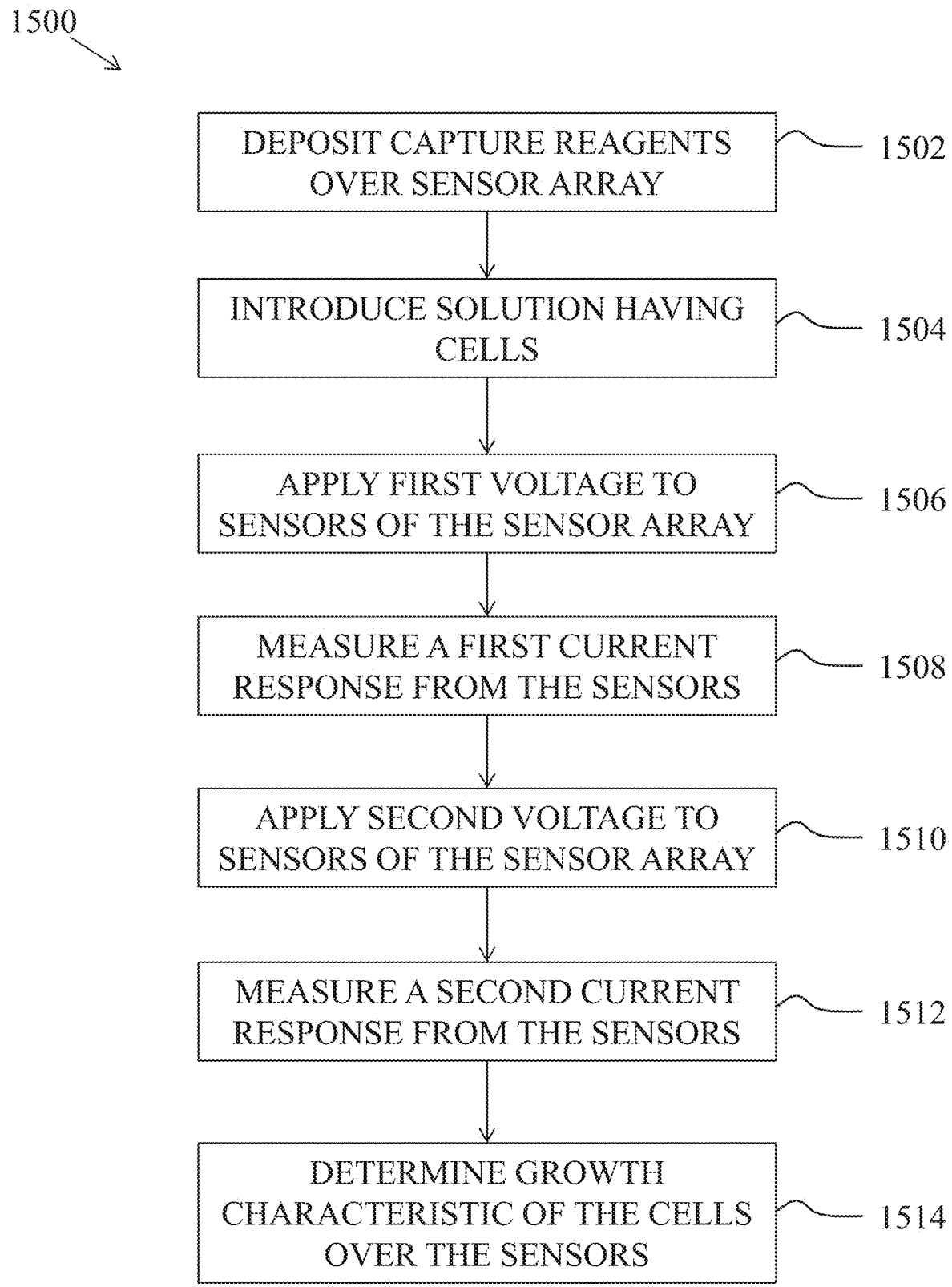
FIG. 15 illustrates a flowchart of another example method for performing sensing with a sensor array.

FIG. 15 illustrates an example method 1500 for using a sensor array to detect the growth rate of target cells or microorganisms, according to some embodiments. Each of the bioFET sensors in the sensor array may be a dual gate back-side FET sensor as illustrated in FIG. 5. It is understood that additional operations can be provided before, during, and after method 1500, and some of the steps described below can be replaced or eliminated, for additional embodiments of the method.

Method 1500 begins at block 1502 where capture reagents are deposited over various bioFET sensors of a sensor array. The capture reagents may be deposited in one or more droplets that are placed over the various bioFET sensors, or flown across the various bioFET sensors in a microfluidic channel. The capture reagents may include antibodies designed to bind to a particular type of cell or microorganism.

After the capture reagents have had enough time to effectively bind to the various bioFET sensors, the method proceeds to block 1504 where a target solution having target cells or microorganisms is introduced over the sensor array. The target solution may be introduced by also dropping a droplet containing the target solution over the various bioFET sensors in the sensor array. In another embodiment, the target solution is flown over the sensor array in a microfluidic channel coupled to the surface of the sensor array. The cells or microorganisms present in the target solution bind to the capture reagents at the various bioFET sensors.

According to some embodiments, after the target cells or microorganisms are bound to their corresponding capture reagents in the sensor array, another solution containing a substrate material, such as glucose, is introduced over the sensor array. The captured cells or microorganisms can break down the glucose to create positively charged byproducts, which can be measured by the corresponding bioFET sensors as a change in the drain current.

Method 1500 proceeds to block 1506 where a first voltage is applied to the gates of the various bioFET sensors having the captured cells or microorganisms. The application of the first voltage causes the bioFET sensors to turn on and conduct, providing a measurable drain current. At block 1508, a first drain current is measured from the various bioFET sensors either individually or collectively. According to some embodiments, the magnitude of the measured first drain current corresponds to the concentration of the cells or microorganisms present at the bioFET sensors at the current time that the first voltage is applied.

Method 1500 proceeds to block 1510 where a second voltage is applied to the gates of the various bioFET sensors having the captured cells or microorganisms. The second voltage may have the same magnitude as the first voltage and is applied to the gates of the various bioFET sensors at a later time than the first voltage. At block 1512, a second drain current is measured from the various bioFET sensors either individually or collectively due to the application of the second voltage. Due to the difference in time between the applied first and second voltages, the growth of the cells or microorganisms will cause an increase in the measured second drain current compared to the measured first drain current. The difference between the first and second drain current may be compared at block 1514 to determine a growth characteristic of the cells or microorganisms at the various bioFET sensors.

In some embodiments, instead of applying separate voltages at different times to the gates of the various bioFET sensors to monitor the growth of the cells or microorganisms, a single voltage is continuously applied and the drain current is continuously measured. In this way, the various bioFET sensors of the sensor array can provide real-time monitoring of the growth of the cells or microorganisms.

General Biological Applications

BioFETs of the present disclosure may be used to determine the presence or absence of a target analyte. In some aspects, the bioFETs may detect and measure absolute or relative concentrations of one or more target analytes. The bioFETs may also be used to determine static and/or dynamic levels and/or concentrations of one or more target analytes, providing valuable information in connection with biological and chemical processes. The bioFETs may further be used to monitor enzymatic reactions and/or non-enzymatic interactions including, but not limited to, binding. As an example, the bioFETs may be used to monitor enzymatic reactions in which substrates and/or reagents are consumed and/or reaction intermediates, byproducts, and/or products are generated. An example of a reaction that can be monitored using a bioFET of the present disclosure is nucleic acid synthesis to, for example, ascertain nucleic acid sequence.

Types of target analytes for use in the embodiments of the present disclosure may be of any nature provided there exists a capture reagent that binds to it selectively and in some instances specifically. Target analytes may be present in the test sample or, for example, generated following contact of the test sample with the sensing layer of a dual gate back-side sensing bioFET or with other reagents in the solution in contact with the sensing layer of a dual gate back-side sensing bioFET. Thus, types of target analytes include, but are not limited to, hydrogen ions (protons) or other ionic species, non-ionic molecules or compounds, metals, metal coordination compounds, nucleic acids, proteins, lipids, polysaccharides, and small chemical compounds such as sugars, drugs, pharmaceuticals, chemical combinatorial library compounds, and the like. Target analytes may be naturally occurring or may be synthesized in vivo or in vitro. Target analytes may indicate that a reaction or interaction has occurred, or indicate the progression thereof. Target analytes measured by a bioFET according to the present disclosure are not, however, limited and may include any of a variety of biological or chemical substances that provide relevant information regarding a biological or chemical process (e.g., binding events such as nucleic acid hybridization and other nucleic acid interactions, protein-nucleic acid binding, protein-protein binding, antigen-antibody binding, receptor-ligand binding, enzyme-substrate binding, enzyme-inhibitor binding, cell stimulation and/or triggering, interactions of cells or tissues with compounds such as pharmaceutical candidates, and the like). It is to be understood that the present disclosure further contemplates detection of target analytes in the absence of a receptor, for example, detection of PPi and Pi in the absence of PPi or Pi receptors. Any binding or hybridization event that causes a change to the transconductance of the dual gate back-side sensing bioFET changes the current that flows from the drain to the source of the sensors described herein and can be detected according to some embodiments.

For detection of various target analytes, the sensing surfaces of the dual gate back-side sensing bioFETs of the present disclosure may be coated with a capture reagent for the target analyte that binds selectively to the target analyte of interest or in some instances to a genus of analytes to which the target analyte belongs. A capture reagent that binds selectively to a target analyte is a molecule that binds preferentially to that analyte (i.e., its binding affinity for that analyte is greater than its binding affinity for any other analyte). Binding affinities for the analyte of interest may be at least about 2-fold, at least about 3-fold, at least about 4-fold, at least about 5-fold, at least about 6-fold, at least about 7-fold, at least about 8-fold, at least about 9-fold, at least about 10-fold, at least about 15-fold, at least about 20-fold, at least about 25-fold, at least about 30-fold, at least about 40-fold, at least about 50-fold, at least about 100-fold, at least about 500-fold, or at least about 1000-fold more than its binding affinity for any other analyte. In addition to relative binding affinity, the capture reagent has an absolute binding affinity that is sufficiently high to efficiently bind the target analyte of interest (i.e., it has a sufficient sensitivity). Capture reagents for use in the methods and systems of the present disclosure may have binding affinities in the femtomolar, picomolar, nanomolar, or micromolar ranges and may be reversible.

The capture reagent may be of any nature (e.g., a chemical, a nucleic acid, a peptide, a lipid, or a combination thereof). The present disclosure contemplates capture reagents that are ionophores, which bind selectively to an ionic species, whether anionic or cationic. In some embodiments, an ionophore is the capture reagent and the ion to which it binds is the target analyte. Ionophores include art-recognized carrier ionophores (i.e., small lipid-soluble molecules that bind to a particular ion) derived from, for example, a microorganism. In some embodiments, the capture reagent is polysiloxane, valinomycin, or salinomycin and the ion to which it binds is potassium. In some embodiments, the capture reagent is monensin, nystatin, or SQI-Pr, and the ion to which it binds is sodium. And in other embodiments, the capture reagent is ionomycin, calcimycine (A23187), or CA 1001 (ETH 1001), and the ion to which it binds is calcium. In other aspects, the present disclosure contemplates capture reagents that bind to more than one ion. For example, beauvericin can be used to detect calcium and/or barium ions, nigericin can be used to detect potassium, hydrogen and/or lead ions, and gramicidin can be used to detect hydrogen, sodium, and/or potassium ions.

Test samples may be from a naturally occurring source or may be non-naturally occurring. Naturally-occurring test samples include, without limitation, bodily fluids, cells, or tissues to be analyzed for diagnostic, prognostic and/or therapeutic purposes. The test sample may include any of cells, nucleic acids, proteins, sugars, lipids, and the like. In various embodiments, test samples may include chemical or biological libraries to be screened for the presence of agents with particular structural or functional attributes. Samples may be a liquid or dissolved in a liquid and of small volume and, as such, are amenable to high-speed, high-density analysis such as analyte detection using microfluidics.

Examples of bioFETs contemplated by various embodiments discussed herein include, but are not limited to, chemical FETS (chemFETs), ion sensitive FETs (ISFETs), immunologic FETs (ImmunoFETs), genetic FETs (GenFETs or DNA-FETs), enzyme FETs (EnFETs), receptor FETs, cell-based FETs, cell-free FETs, and liquid biopsy FETs. Thus, the bioFETs described herein can be used to detect target analytes with capture reagents and, as such, define the bioFET type that are not mutually exclusive. As a non-limiting example, a liquid biopsy FET may detect cell-free DNA and may also be referred to as a cell-free FET or a DNA-FET. See, e.g., Sakata et al. "Potentiometric Detection of Single Nucleotide Polymorphism by Using a Genetic Field-effect transistor," *Chembiochem* 6 (2005): 703-10; Uslu et al. "Labelfree fully electronic nucleic acid detection system based on a field-effect transistor device," *Biosens Bioelectron* 19 (2004): 1723-31; Sakurai et al. "Real-time monitoring of DNA polymerase reactions by a micro ISFET pH sensor," *Anal Chem* 64.17 (1992): 1996-1997.

For example, some embodiments provide a method for detecting a nucleic acid that includes contacting probe nucleic acids bound to a surface of a back-side sensing layer of a dual gate back-side sensing bioFET with a sample and detecting binding of a nucleic acid from the sample to one or more regions of the probe nucleic acids. Such a nucleic acid detecting bioFET may also be referred to as a GenFET or DNA-FET.

In other aspects, some embodiments provide a method for detecting a protein that includes contacting probe protein molecules bound to a surface of a back-side sensing layer of a dual gate back-side sensing bioFET with a sample and detecting binding of a protein from the sample to one or more regions of the probe protein molecules. GenFETs and DNA-FETs may be used to detect the protein.

In other aspects, some embodiments provide a method for detecting a nucleic acid that includes contacting probe protein molecules bound to a surface of a back-side sensing layer of a dual gate back-side sensing bioFET with a sample and detecting binding of a nucleic acid from the sample to one or more regions of the probe protein molecules. In yet other aspects, some embodiments provide a method for detecting an antigen that includes contacting probe antibodies bound to a back-side sensing layer of a dual gate back-side sensing bioFET with a sample and detecting binding of an antigen from the sample to one or more regions of the probe antibodies. Such protein or antibody binding bioFETs may also be referred to as ImmunoFETs.

In other aspects, some embodiments provide a method for detecting an enzyme substrate or inhibitor that includes contacting probe enzymes bound to a surface of a back-side sensing layer of a dual gate back-side sensing bioFET with a sample and detecting binding of an entity from (or generation of an enzymatic product in) the sample to one or more regions of the probe enzymes. In yet other aspects, some embodiments provide a method for detecting an enzyme that includes contacting enzyme substrates or inhibitors bound to a surface of a back-side sensing layer of a dual gate back-side sensing bioFET with a sample and detecting binding of an entity from (or generation of an enzymatic product in) the sample to one or more of the enzyme substrates or inhibitors. Such an enzyme based bioFET may also be referred to as an EnFET.

In other aspects, some embodiments provide a method for detecting protein-small molecule (e.g., organic compound) interactions that includes contacting small molecules bound to a surface of a back-side sensing layer of a dual gate back-side sensing bioFET with a sample and detecting binding of proteins from the sample to one or more regions of the probe small molecules. In yet other aspects, some embodiments provide a method for detecting nucleic acid-small-molecule (e.g., organic compound) interactions that includes contacting small molecules bound to a surface of a back-side sensing layer of a dual gate back-side sensing bioFET with a sample and detecting binding of nucleic acids from the sample to one or more regions of the probe small molecules. In either detection method, the sample may include small molecules and the capture reagents bound to the surface of the back-side sensing layer may be either nucleic acids or proteins. In other aspects, the target analytes of interest are heavy metals and other environmental pollutants, and/or the bioFET arrays are specifically configured to detect the presence of different pollutants. Such small molecule or chemical-sensing bioFETs may also be referred to as chemFETs.

In other aspects, some embodiments provide a method for detecting hydrogen ions and/or changes in H+ concentration (i.e., changes in pH). Such ion-sensing bioFETs may also be referred to as ISFETs.

The systems and methods described herein can also be used to aid in the identification and treatment of disease. For example, some embodiments provide a method for identifying a sequence associated with a particular disease or for identifying a sequence associated with a response to a particular active ingredient or treatment or prophylactic agent that includes contacting a capture reagent (e.g., a nucleic acid probe) bound to a surface of a back-bside sensing layer of a dual gate back-side sensing bioFET with a sample, and detecting binding of nucleic acids (e.g., including a variant or lacking nucleic acids otherwise contained in a corresponding wild-type nucleic acid sequence) from the sample to one or more regions of the capture reagent. Such bioFETs may also be referred to as GenFETs, DNA-FETs, or liquid biopsy FETs.

Further Applications

Several additional applications of the dual gate back-side sensing bioFETs described herein are contemplated. For example, the sensing layer of a dual gate back-side sensing bioFET provides real-time, label-free quantification and analysis for a variety of biological, chemical, and other applications including, but not limited to, gene expression analysis, comparative genome hybridization (CGH), array-based exon enrichment processes, protein sequencing, tissue microarrays, and cell culture. In some embodiments, the dual gate back-side sensing bioFET may be used to screen samples including, but not limited to, bodily fluids and/or tissues such as blood, urine, saliva, CSF, or lavages or environmental samples such as water supply samples or air samples, for the presence or absence of a substance. For example, the arrays may be used to determine the presence or absence of pathogens (e.g., food-borne or infectious pathogens) such as viruses, bacteria, or parasites based on target genomic, proteomic, and/or other elements. The arrays may also be used to identify the presence or absence or characterize cancer cells or cells that are indicative of another condition or disorder, in a subject. Additional applications for use of the dual gate back-side sensing bioFETs described herein include those described in U.S. Pat. No. 8,349,167 (Gene expression analysis, comparative genome hybridization (CGH), array-based exon enrichment processes); U.S. Pat. No. 8,682,592 (Non-Invasive Prenatal Diagnosis (NIP D), DNA/RNA contamination, SNP identification); U.S. Pat. No. 9,096,899 (Method of amplifying and sequencing DNA within a flow cell is provided); U.S. Pat. No. 9,340,830 (Analyzing a tumor sample); U.S. Pat. No. 9,329,173 (Automated system for testing for *Salmonella enterica* bacteria); U.S. Pat. No. 9,341,529 (Method for manufacturing a pressure sensor); U.S. Pub. Appl. Nos. 2015/0353920; 2015/0355129 (Chemical and biological substances detection in bodily fluid); 2016/0054312 (Chemically differentiated sensor array for sample analysis); 2016/0040245 (Identification and molecular characterization of the CTCs associated with neuroendocrine prostate cancer (NEPC).

In some embodiments, the dual gate back-side sensing bioFETs may be used to obtain single cell gene expression profiles from one or more cells in a cellular sample of interest, for example, in heterogeneous cellular samples. Such samples often exhibit a high degree of variation in their gene/biomarker expression levels (e.g., due to the cell cycle, environment, and stochastic mechanism of transcription/translation), even among individual cells that have the same phenotype. The dual gate back-side sensing bioFETs enable interrogation of the expression profile of each cell in the sample. In certain aspects, the subject methods for single-cell molecular profiling obviate the need for separating cells of interest from a heterogeneous cellular sample with individual profiling available at each dual gate back-side sensing bioFET. Direct molecular profiling in heterogeneous cell samples is advantageous for clinical diagnostic and biomarker discovery applications. In certain aspects, the dual gate back-side sensing bioFETs are used in molecular profiling and cellular subtyping of heterogeneous original or enriched disease tissue and biological fluid samples, for example, biopsy tumor samples, endothelial cells from cardiovascular disease samples, bone marrow samples, lymph node samples, lymph, amniotic fluid, brain samples from different neurological disorders, lung pathological samples, and/or any other heterogeneous disease tissue sample of interest. Thus, for example, the dual gate back-side sensing bioFETs are used in the molecular profiling of normal biological tissue and biological fluid samples, to elucidate, for example, the mechanisms of differentiation, immune responses, cell-cell communication, or brain development.

In some embodiments, the dual gate back-side sensing bioFETs are used in obtaining single cell expression profiles in circulating tumor cells (CTCs). CTCs may derive from metastases and can recirculate through the bloodstream and lymph to colonize distinct organs and/or the primary tumor, giving rise to secondary metastasis. CTCs play a critical role in the metastatic spread of carcinomas. Therefore, detection of CTCs in blood (liquid biopsy) or disseminating tumor cells (DTC) in bone marrow may be used to monitor tumor staging and would improve the identification, diagnosis, and treatment of cancer patients at high risk of metastatic relapse. See, e.g., U.S. Pat. No. 9,340,830 (Col. 205, lines 61-64); U.S. Pat. No. 9,447,411 (Col. 21, lines 42-54); U.S. Pat. No. 9,212,977 (Col. 19, lines 56-67); U.S. Pat. No. 9,347,946 (Col. 9, lines 16-30). In some embodiments, the dual gate back-side sensing bioFETs are used to obtain expression and mutation profiles in a cellular sample that includes CTCs as well as non-target contaminating cell types (e.g., leukocytes). See, e.g., U.S. Pat. No. 9,340,830 (Col. 1, lines 41-67); U.S. Pat. No. 9,447,411 (Col. 2, lines 41-55); U.S. Pat. No. 9,212,977 (Col. 2, lines 48-67; Col. 3 lines 1-10); and U.S. Pat. No. 9,347,946 (Col. 9).

In other embodiments, the dual gate back-side sensing bioFETs described herein may provide point-of-care, portable, and/or real-time diagnostic tools. They may, for example, provide an electronic readout of an enzyme linked immunosorbent assay (ELISA) or other assays to detect various chemical or biological substances. The dual gate back-side sensing bioFETs may be configured to transduce or convert a biochemical binding event or reaction into an electrical signal, which may be read out. Indirect detection of a freely diffusing, electronically active species produced at the site of a bound chemical or biological substance may be performed utilizing the dual gate back-side sensing bioFETs. Electronic readout ELISA schemes where an enzyme capable of producing an electronically active species may be used. In some embodiments, riboswitches are used to detect metabolites. See, e.g., Mironov, Alexander S., et al., "Sensing small molecules by nascent RNA: a mechanism to control transcription in bacteria." *Cell* 111.5 (2002): 747-756; Winkler, Wade, Ali Nahvi, and Ronald R. Breaker, "Thiamine derivatives bind messenger RNAs directly to regulate bacterial gene expression." *Nature* 419.6910 (2002): 952-956. In some embodiments, the dual gate back-side sensing bioFET arrays are used to measure the kinetics of a reaction and/or compare the activities of enzymes, including substrates, a co-factor, or another moiety for readout.

Other applications for the dual gate back-side sensing bioFET arrays involve the use of molecular recognition sites, where molecules that specifically recognize particular target molecules are either identified or designed and applied to the surface of the array. Previous work with chemFETs has demonstrated the ability of single individual ISFETs to recognize ions such as potassium.

In some embodiments, the dual gate back-side sensing bioFET is used to monitor the presence and/or amount of specific molecules including, for example, environmental testing of specific toxins and important elements. Such testing may use molecular recognition sites to measure both pollution gases and particulate contamination, where molecules that specifically recognize particular target molecules are either identified or designed and applied to the surface of the array. See, e.g., Brzozka et al. "Enhanced performance of potassium CHEMFETs by optimization of a polysiloxane membrane," *Sensors and Actuators B. Chemical* 18, 38-41 (1994); Sibbald et al. "A miniature flow-through cell with a four-function ChemFET integrated circuit for simultaneous measurements of potassium, hydrogen, calcium and sodium ions," *Analytica Chimica Acta.* 159, 47-62 (1984); Cobben et al. "Transduction of selective recognition of heavy metal ions by chemically modified field effect transistors (CHEM-FETs)," *Journal of the American Chemical Society* 114, 10573-10582 (1992). In some embodiments, the dual gate back-side sensing bioFET can be used with a personal, portable, and wearable detector system. This system can act as an early warning device indicating to the user that the pollution levels in their current local environment is at a level that could cause the user some discomfort or even lead to breathing problems. This is particularly relevant to people suffering from respiratory or bronchial or asthma conditions, where the user needs to take necessary precautions. The dual gate back-side sensing bioFET has the capability of detecting individual gases such as, for example, NOx, $SO_2$ and or CO and/or monitoring temperature and humidity. See U.S. Pub. Appl. Nos. 2014/0361901; 2016/0116434 (Paragraph [0117]). The pollution sensors may, for example, be referred to as a gas field effective transistor (gasFET). A gasFET may contain, for example, an FET with a gate metallization exposed to the surrounding atmosphere. When a gas is absorbed on the surface, protons can diffuse to the metal gas interface. This results in a dipole layer which affects the threshold voltage of the device.

In some embodiments, the dual gate back-side sensing bioFET may be used in vivo by introduction into a subject (e.g., in the brain or other region that is subject to ion flux) and then analyzing for changes. For example, electrical activity of cells may be detected by ionic flow. Thus, a bioFET array can be integrated onto a novel ion-discriminating tissue probe. Other applications include, for example, cochlear prosthesis and retinal and cortical implants. See, e.g., Humayun et al. Vision Research 43, 2573-2581 (2003); Normann et al. Vision Research 39, 2577-2587 (1999).

Final Remarks

Described herein are embodiments of a sensor array having a plurality of dual-gate back side sensing bioFETs and methods of using the sensor array. According to some embodiments, a sensor array includes a semiconductor substrate, a first plurality of FET sensors and a second plurality of FET sensors. The first plurality of FET sensors each includes a first channel region between a source and a drain region in the semiconductor substrate and underlying a gate structure disposed on a first side of the first channel region, and a dielectric layer disposed on a second side of the first channel region opposite from the first side of the first channel region. A first plurality of capture reagents is coupled to the dielectric layer over the first channel region. The second plurality of FET sensors each includes a second channel region between a source and a drain region in the semiconductor substrate and underlying a gate structure disposed on a first side of the second channel region, and the dielectric layer disposed on a second side of the second channel region opposite from the first side of the second channel region. A second plurality of capture reagents is coupled to the dielectric layer over the second channel region. The second plurality of capture reagents is different from the first plurality of capture reagents. The first plurality of FET sensors and the second plurality of FET sensors are arranged in a two-dimensional array.

According to some embodiments, a method of using a sensor device includes depositing a first droplet of solution containing a first plurality of capture reagents over a first plurality of FET sensors formed in a semiconductor substrate. The first plurality of capture reagents binds to a dielectric layer on a first surface of the semiconductor substrate in a first plurality of openings arranged over the first plurality of FET sensors. The method also includes depositing a second droplet of solution containing a second plurality of capture reagents over a second plurality of FET sensors formed in the semiconductor substrate. The second plurality of capture reagents binds to the dielectric layer on the first surface of the semiconductor substrate in a second plurality of openings arranged over the second plurality of FET sensors. The second plurality of capture reagents is different than the first plurality of capture reagents. The method also includes introducing a target solution over the first plurality of FET sensors and the second plurality of FET sensors. The method also includes applying a first voltage to a plurality of first gate structures of the first plurality of FET sensors. The first gate structures are on a second surface of the semiconductor substrate opposite to the first surface of the semiconductor substrate. The method also includes applying a second voltage to a plurality of second gate structures of the second plurality of FET sensors. The second gate structures are on a second surface of the semiconductor substrate opposite to the first surface of the semiconductor substrate. The method includes determining the presence of one or more target analytes in the target solution based on the application of at least one of the first voltage or the second voltage.

According to some embodiments, a method of using a sensor device includes depositing a solution containing a plurality of capture reagents over a plurality of FET sensors formed in a semiconductor substrate. The plurality of capture reagents binds to a dielectric layer on a first surface of the semiconductor substrate in a plurality of openings arranged over the plurality of FET sensors. The method also includes introducing a second solution over the plurality of FET sensors such that one or more cells in the second solution binds to the capture reagents bound to the dielectric layer of the plurality of FET sensors. The method includes applying a first voltage to a plurality of gate structures of the plurality of FET sensors. The plurality of gate structures is on a second surface of the semiconductor substrate opposite to the first surface of the semiconductor substrate. A first current response of the plurality of FET sensors is measured based on the applying of the first voltage. The method also includes applying a second voltage to the plurality of gate structures of the plurality of FET sensors at a given time period after the applying of the first voltage, and measuring a second current response of the plurality of FET sensors based on the applying of the second voltage. The method includes determining a growth characteristic of the one or more cells based on a comparison between the first current response and the second current response.

It is to be appreciated that the Detailed Description section, and not the Abstract of the Disclosure section, is intended to be used to interpret the claims. The Abstract of the Disclosure section may set forth one or more but not all exemplary embodiments of the present disclosure as contemplated by the inventor(s), and thus, is not intended to limit the present disclosure and the subjoined claims in any way.

It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined in accordance with the subjoined claims and their equivalents.

What is claimed is:

1. A sensor array, comprising:
    a semiconductor substrate;
    a first plurality of field effect transistor (FET) sensors, each of the FET sensors comprising:
        a first channel region between a first source region and a first drain region in the semiconductor substrate and underlying a first gate structure disposed on a first side of the first channel region,
        a first portion of a dielectric layer disposed on a second side of the first channel region opposite from the first side of the first channel region, and
        a first plurality of capture reagents coupled to the first portion of the dielectric layer; and
    a second plurality of FET sensors, each of the FET sensors comprising:
        a second channel region between a second source region and a second drain region in the semiconductor substrate and underlying a second gate structure disposed on a first side of the second channel region,
        a second portion of the dielectric layer disposed on a second side of the second channel region opposite from the first side of the second channel region, and
        a second plurality of capture reagents coupled to the second portion of the dielectric layer, wherein the second plurality of capture reagents is different from the first plurality of capture reagents,
    wherein the first plurality of FET sensors and the second plurality of FET sensors are arranged in a two-dimensional array and are coupled to a common reference electrode.

2. The sensor array of claim 1, further comprising:
    an insulating layer disposed over a surface of the semiconductor substrate.

3. The sensor array of claim 2, wherein the insulating layer comprises a plurality of openings through the insulating layer, the plurality of openings being arranged over the first channel regions and the second channel regions.

4. The sensor array of claim 3, wherein the dielectric layer is disposed in the plurality of openings.

5. The sensor array of claim 3, wherein each of the plurality of openings has an area between 500 nm×500 nm and 500 µm×500 µm.

6. The sensor array of claim 1, wherein at least one of the first plurality of capture reagents and the second plurality of capture reagents includes compounds chosen from the list comprising of: RNA, DNA, antibodies, enzymes, proteins, and cells.

7. The sensor array of claim 1, wherein the dielectric layer comprises a high-k dielectric material.

8. The sensor array of claim 1, further comprising a microfluidic channel arranged over the first plurality of FET sensors and the second plurality of FET sensors.

9. A sensor, comprising:
    a substrate;
    a first field effect transistor (FET) comprising first source/drain (S/D) regions disposed within the substrate, a first channel region disposed between the first S/D regions, and a first gate structure disposed on a first surface of the substrate;
    a second FET comprising second S/D regions disposed within the substrate, a second channel region disposed between the second S/D regions, and a second gate structure disposed on the first surface of the substrate, wherein the first and second FETs are coupled to a common reference electrode;
    an insulating layer with openings disposed on a second surface of the substrate;
    first and second well regions disposed on the first and second channel regions, respectively, through the openings; and
    first and second dielectric layers disposed within the first and second well regions, respectively, wherein the first and second dielectric layers comprise materials different from each other.

10. The sensor of claim 9, further comprising first and second capture reagents coupled to the first and second dielectric layers, respectively, wherein the first and second capture reagents are different from each other.

11. The sensor of claim 9, wherein the first and second dielectric layers are disposed on the first and second channel regions, respectively.

12. The sensor of claim 9, wherein the first and second dielectric layers are in physical contact with each other.

13. The sensor of claim 9, wherein the dielectric layer comprises a high-k dielectric material.

14. The sensor of claim 9, wherein the first FET is configured to detect a first type of analyte and the second FET is configured to detect a second type of analyte that is different from the first type of analyte.

15. The sensor of claim 9, wherein the first FET is configured to monitor growth of biomolecules and the second FET is configured to detect presence of an analyte in a sample.

16. A sensor array, comprising:
    a substrate;
    an array of first field effect transistors (FETs), wherein each of the first FETs comprises first source/drain (S/D) regions disposed within the substrate, a first channel region disposed between the first S/D regions, and a first gate structure disposed on a first surface of the substrate;
    an array of second FETs, wherein each of the second FETs comprises second S/D regions disposed within the substrate, a second channel region disposed between the second S/D regions, and a second gate structure disposed on the first surface of the substrate, wherein the array of first FETs and the array of second FETs are arranged in a two-dimensional array and are coupled to a common reference electrode;

an interface layer disposed on the first and second channel regions; and a plurality of capture reagents coupled to portions of the interface layer on the first channel regions, wherein portions of the interface layer on the second channel regions are free of any capture reagents.

17. The sensor array of claim 16, wherein the first FETs in the array of first FETs are configured to detect a first type of analyte in a sample and the second FETs in the array of second FETs are configured to provide control signals to the first FETs.

18. The sensor array of claim 17, further comprising an array of third FETs configured to detect a second type of analyte in the sample, wherein the first and second types of analytes are different from each other.

19. The sensor array of claim 16, further comprising an insulating layer disposed between the interface layer and a second surface of the substrate.

20. The sensor array of claim 16, wherein the interface layer comprises a high-k dielectric material.

* * * * *